(12) United States Patent
Kim et al.

(10) Patent No.: US 11,997,225 B2
(45) Date of Patent: May 28, 2024

(54) ELECTRONIC DEVICE COMPRISING FLEXIBLE DISPLAY

(71) Applicant: SAMSUNG ELECTRONICS CO., LTD., Suwon-si (KR)

(72) Inventors: Minuk Kim, Suwon-si (KR); Harksang Kim, Suwon-si (KR); Jiyoung Kwak, Suwon-si (KR); Soonik Park, Suwon-si (KR); Sungho Ahn, Suwon-si (KR); Sangyong Eom, Suwon-si (KR); Hyunwoong Chung, Suwon-si (KR); Joungmin Cho, Suwon-si (KR); Kwangtai Kim, Suwon-si (KR); Donghyun Yeom, Suwon-si (KR); Changryong Heo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 311 days.

(21) Appl. No.: 17/623,108

(22) PCT Filed: Jun. 24, 2020

(86) PCT No.: PCT/KR2020/008236
§ 371 (c)(1),
(2) Date: Dec. 27, 2021

(87) PCT Pub. No.: WO2020/262965
PCT Pub. Date: Dec. 30, 2020

(65) Prior Publication Data
US 2022/0368786 A1 Nov. 17, 2022

(30) Foreign Application Priority Data
Jun. 24, 2019 (KR) .................. 10-2019-0075287

(51) Int. Cl.
H04M 1/02 (2006.01)

(52) U.S. Cl.
CPC ....... *H04M 1/0268* (2013.01); *H04M 1/0216* (2013.01)

(58) Field of Classification Search
CPC ............. H04M 1/0268; H04M 1/0216; H04M 1/0214; H04M 1/0245; G06F 1/1616
(Continued)

(56) References Cited

U.S. PATENT DOCUMENTS 8,005,516 B2 * 8/2011 Ohki .................. H04M 1/0212
455/566
9,013,867 B2 * 4/2015 Becze .................. G06F 1/1641
361/679.01
(Continued)

FOREIGN PATENT DOCUMENTS

CN 107277196 10/2017
CN 108352459 7/2018
(Continued)

OTHER PUBLICATIONS

International Search Report for PCT/KR2020/008236 dated Sep. 29, 2020, 5 pages w/ English Translation.
(Continued)

*Primary Examiner* — April G Gonzales
(74) *Attorney, Agent, or Firm* — Nixon & Vanderhye, P.C.

(57) ABSTRACT

A portable communication device in an embodiment may include a housing which forms an exterior of the portable communication device; a flexible display at least partially received in the housing and bendable with respect to a bending axis, the flexible display including at least one layer, an opening formed in the at least one layer; and an image sensor module at least partially positioned in a space formed by the opening, wherein the at least one layer may include a first inner side surface positioned in a first direction based
(Continued)

on the image sensor module and a second inner side surface positioned in a second direction opposite to the first direction based on the image sensor module, as the flexible display is at least partially bent, the first inner side surface may be moved in the second direction, and if the flexible display is substantially flat, a first separation distance between a first side surface of the image sensor module facing the first inner side surface of the at least one layer and the first inner side surface of the at least one layer may be greater than a second separation distance between a second side surface of the image sensor module facing the second inner side surface of the at least one layer and the second inner side surface of the at least one layer.

13 Claims, 17 Drawing Sheets

(58) Field of Classification Search
USPC .............................................. 455/566, 575.3
See application file for complete search history.

(56) References Cited

U.S. PATENT DOCUMENTS

| | | | | |
|---|---|---|---|---|
| 9,472,779 | B2* | 10/2016 | Kim | H10K 50/844 |
| 2006/0260122 | A1* | 11/2006 | Honjo | H05K 1/186 |
| | | | | 29/829 |
| 2010/0147569 | A1* | 6/2010 | Honjo | H05K 3/284 |
| | | | | 174/258 |
| 2015/0119114 | A1* | 4/2015 | Smith | A45C 11/00 |
| | | | | 455/566 |
| 2015/0338888 | A1* | 11/2015 | Kim | G06F 1/1643 |
| | | | | 345/156 |
| 2016/0070303 | A1* | 3/2016 | Lee | G06F 1/1616 |
| | | | | 361/679.27 |
| 2016/0179236 | A1* | 6/2016 | Shin | H04M 1/0216 |
| | | | | 345/173 |
| 2016/0246470 | A1* | 8/2016 | Doi | G06F 1/1677 |
| 2017/0068275 | A1* | 3/2017 | Lee | G06F 1/1643 |
| 2017/0208157 | A1* | 7/2017 | Kim | H04M 1/0268 |
| 2017/0255442 | A1* | 9/2017 | Kim | G06F 1/1652 |
| 2017/0287992 | A1* | 10/2017 | Kwak | H10K 59/40 |
| 2018/0059718 | A1* | 3/2018 | Ramaswamy | G06F 1/1643 |
| 2018/0095502 | A1* | 4/2018 | Yamazaki | H10K 59/121 |
| 2018/0196475 | A1* | 7/2018 | Bao | G02F 1/133514 |
| 2018/0198896 | A1* | 7/2018 | Kang | G06F 1/1652 |
| 2018/0341290 | A1* | 11/2018 | Sim | G06F 1/1658 |
| 2019/0028579 | A1* | 1/2019 | Cho | G06F 3/04886 |

FOREIGN PATENT DOCUMENTS

| | | |
|---|---|---|
| JP | 2006-324567 | 11/2006 |
| JP | 2008-053364 | 3/2008 |
| KR | 20-0405169 | 12/2005 |
| KR | 10-2017-0111827 | 10/2017 |
| KR | 10-2018-0130151 | 12/2018 |
| KR | 10-2019-0052475 | 5/2019 |

OTHER PUBLICATIONS

Written Opinion of the ISA for PCT/KR2020/008236 dated Sep. 29, 2020, 8 pages w/ English Translation.
Hearing Notice dated Apr. 21, 2023 in Indian Patent Application No. IN202217002411 and English-language translation.
Extended European Search Report dated Jul. 13, 2022 in EP Application No. 20832582.9.
Examination Report dated Dec. 9, 2022 in Indian Patent Application No. IN202217002411 and English-language translation.
Office Action dated Nov. 2, 2023 in Chinese Patent Application No. 2020800596653 and English-language translation.

* cited by examiner

ELECTRONIC DEVICE COMPRISING FLEXIBLE DISPLAY

This application is the U.S. national phase of International Application No. PCT/KR2020/008236 filed Jun. 24, 2020 which designated the U.S. and claims priority to KR Patent Application No. 10-2019-0075287 filed Jun. 24, 2019, the entire contents of each of which are hereby incorporated by reference.

BACKGROUND

FIELD

Various embodiments relate to an electronic device including a flexible display.

DESCRIPTION OF RELATED ART

In a mobile device, as an area occupied by a display widens and an area of a bezel reduces, a front camera may be disposed in a display area rather than the bezel. An opening may be formed in the display area corresponding to the front camera for the front camera to record an object. For example, the display may include a punching hole therein.

SUMMARY

A foldable electronic device may include an opening for a camera inside a display. A window is disposed on the display to protect the display, and a camera module is disposed just beneath the window in the opening of the display. If a load is applied toward the camera in the opening of the display, the window may sag, interfere with the camera, and exert an impact on the camera.

Meanwhile, if a flexible display of the foldable electronic device is folded or unfolded, layers of the flexible display may slip with respect to their neighboring layer. A component of the electronic device disposed near a side surface of the flexible display may be affect by such a slip. For example, if the foldable electronic device is folded or unfolded, the camera disposed in a punching hole of the flexible display may have a physical impact by some layer of the flexible display.

If the impact is applied to the camera, the camera may be damaged or the camera may be misaligned. In this case, an image quality acquired by the camera may be degraded. According to various embodiments of the present disclosure, an apparatus for protecting the camera module from the impact with the window or the display may be provided.

The technical problem to achieve in the present document is not limited to the technical problem mentioned above, and other technical problems not mentioned above may be clearly understood by those skilled in the technical field to which the present invention belongs from the following descriptions.

In an embodiment, a portable communication device may include a housing which forms an exterior of the portable communication device; a flexible display at least partially received in the housing and bendable with respect to a bending axis, the flexible display including at least one layer, an opening formed in the at least one layer; and an image sensor module at least partially positioned in a space formed by the opening, wherein the at least one layer may include a first inner side surface positioned in a first direction based on the image sensor module and a second inner side surface positioned in a second direction opposite to the first direction based on the image sensor module, as the flexible display is at least partially bent, the first inner side surface may be moved in the second direction, and if the flexible display is substantially flat, a first separation distance between a first side surface of the image sensor module facing the first inner side surface of the at least one layer and the first inner side surface of the at least one layer may be greater than a second separation distance between a second side surface of the image sensor module facing the second inner side surface of the at least one layer and the second inner side surface of the at least one layer.

In an embodiment, a portable communication device may include a housing which forms an exterior of the portable communication device; a flexible display at least partially received in the housing and bendable with respect to a bending axis, the flexible display including a first layer and a second layer positioned between the housing and the first layer, an opening formed in the first layer and the second layer; and an image sensor module at least partially positioned in a space formed by the opening, wherein the first layer may include a first inner side surface positioned in a first direction based on the image sensor module and a second inner side surface positioned in a second direction opposite to the first direction based on the image sensor module, the second layer, include a third inner side surface positioned in the first direction based on the image sensor module and a fourth inner side surface positioned in the second direction based on the image sensor module, as the flexible display is at least partially bent, the first inner side surface and the third inner side surface may be moved in the second direction, and if the flexible display is substantially flat, a first separation distance between a side surface of the image sensor module facing the first inner side surface of the first layer and the first inner side surface of the first layer may be different from a second separation distance between the side surface of the image sensor module and the third inner side surface of the second layer.

In an embodiment, a portable communication device may include a housing; an image sensor module received in the housing; and a flexible display received in the housing, and bendable with at least a partial area, the flexible display including a plurality of layers, an opening formed at a position corresponding to the image sensor module in at least one layer of the plurality of the layers, the at least one layer configured to, as the flexible display is bent or unbent, change a first distance between a first portion of a first direction with respect to the opening of the at least one layer and a first side surface of the image sensor module facing the first portion, and a second distance between a second portion of a second direction with respect to the opening of the at least one layer and a second side surface of the image sensor module facing the second portion.

An electronic device according to various embodiments, may protect a camera module by removing or mitigating an impact applied by a window or a display to the camera module.

An electronic device according to an embodiment, may prevent a camera module from being shaken or damaged by an external impact, by preventing a window from colliding with the camera module by a load exerted to an area corresponding to the camera module of the window.

An electronic device according to an embodiment, may prevent a camera module from being shaken or damaged by an external impact, by preventing a display from interfering with the camera module by deformation of layers of the display according to unfolding or folding of the electronic device.

DETAILED DESCRIPTION

Figure 1:
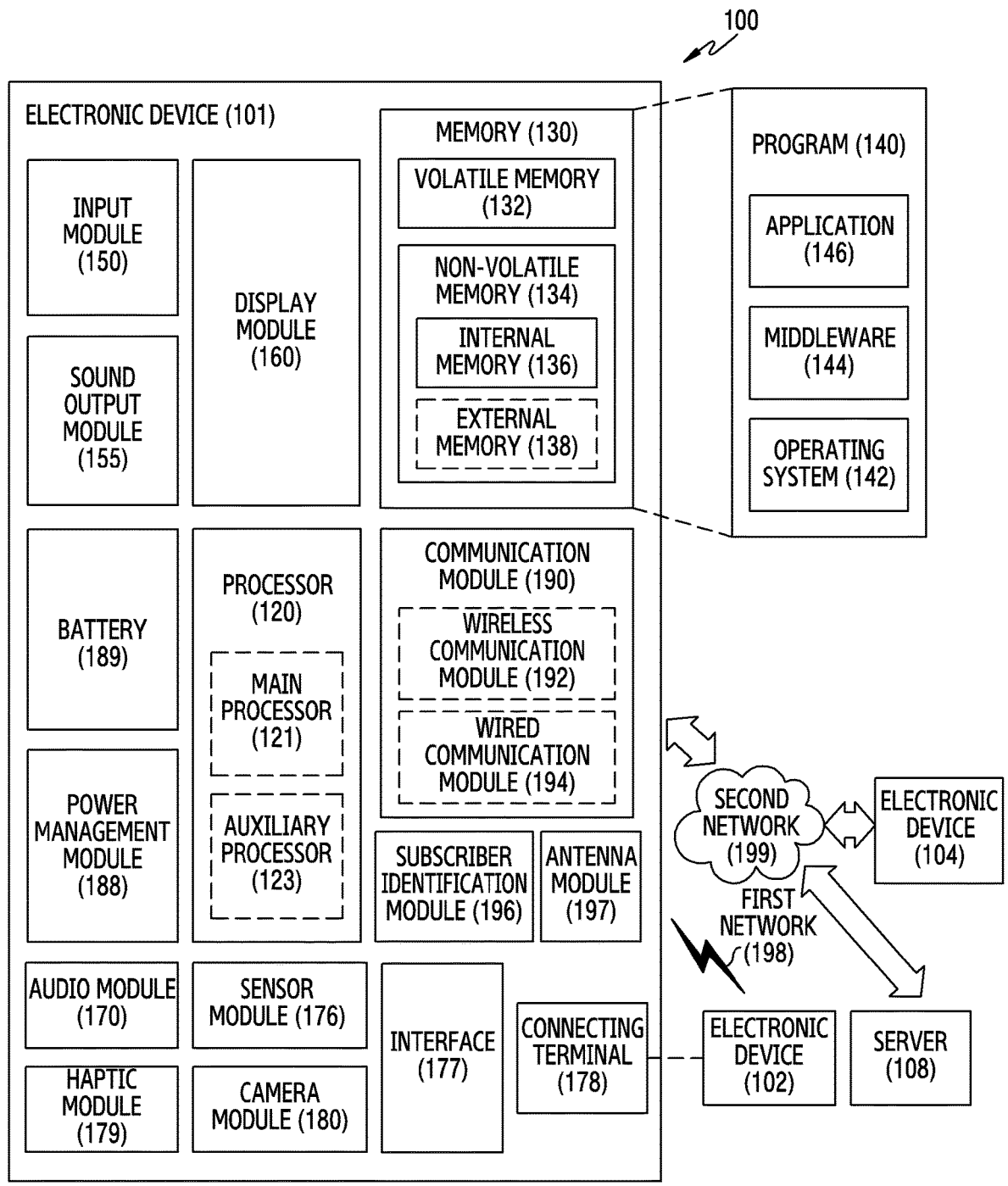
FIG. 1 is a block diagram of an electronic device in a network environment, according to various embodiments.

FIG. 1 is a block diagram of an electronic device in a network environment, according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to various embodiments disclosed herein may include various types of devices. The electronic device may include, for example, a portable communication device (e.g., a smartphone), a computer device, a portable multimedia device, a portable medical device, a camera, a wearable device, or a home appliance. The electronic device according to the embodiments disclosed herein is not limited to the foregoing devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
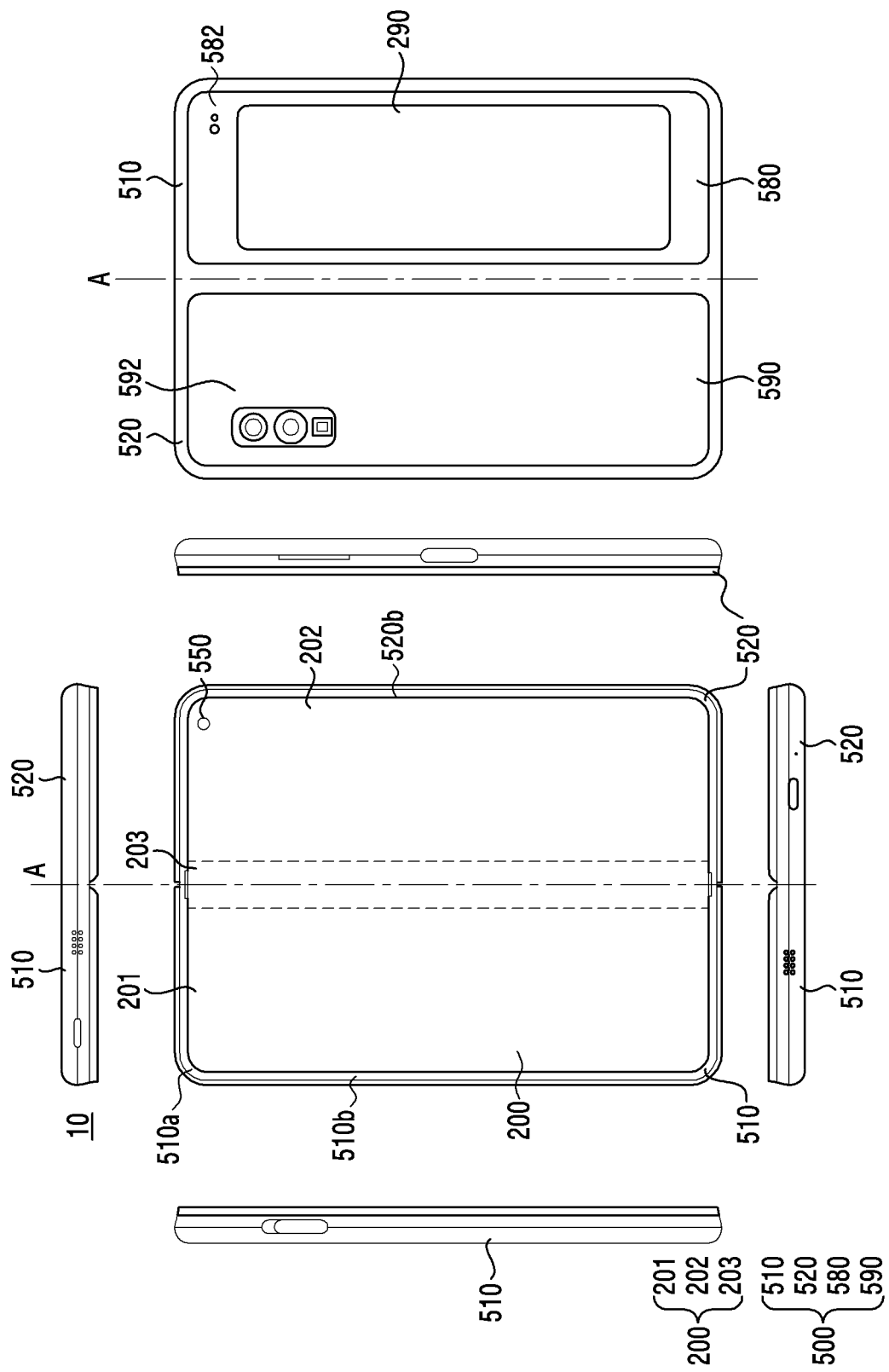
FIG. 2A is a diagram illustrating an unfolded state of an electronic device according to an embodiment.
Figure 2B:
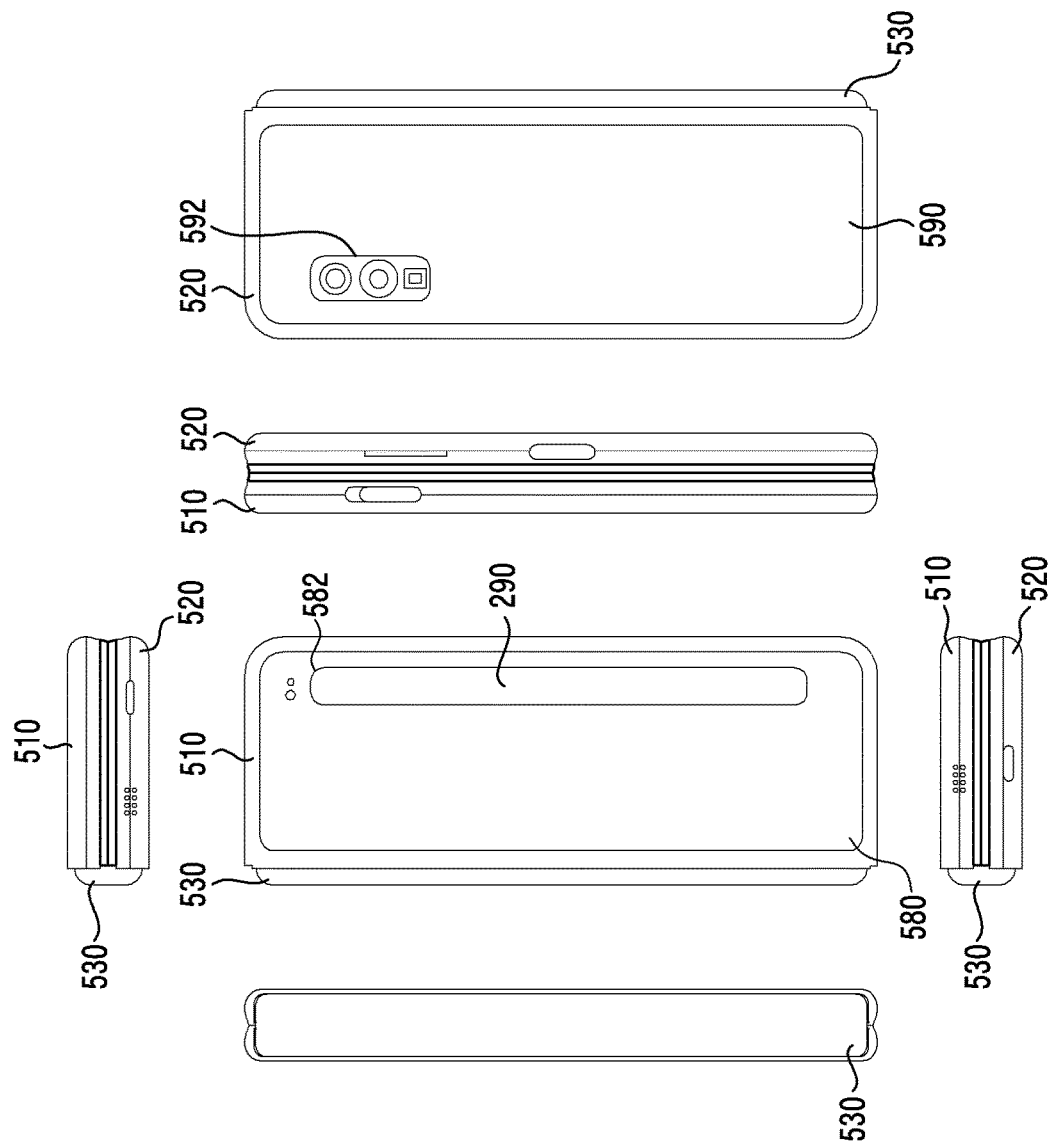
FIG. 2B is a diagram illustrating a folded state of the electronic device according to an embodiment.

Referring to FIGS. 2A and 2B, in an embodiment, the electronic device 10 may include a foldable housing 500, a hinge cover 530 that covers a foldable portion of the foldable housing 500, and a flexible or foldable display 200 (hereinafter, abbreviated to the "display 200") that is disposed in a space formed by the foldable housing 500. In this disclosure, a surface on which the display 200 is disposed is defined as a first surface or a front surface of the electronic device 10. A surface opposite to the front surface is defined as a second surface or a rear surface of the electronic device 10. A surface that surrounds a space between the front surface and the rear surface is defined as a third surface or a side surface of the electronic device 10.

In an embodiment, the foldable housing 500 may include a first housing structure 510, a second housing structure 520, a first back cover 580, and a second back cover 590. The foldable housing 500 of the electronic device 10 is not limited to the form and the coupling illustrated in FIGS. 2A and 2B and may be implemented by a combination and/or a coupling of other shapes or parts. For example, in another embodiment, the first housing structure 510 and the first back cover 580 may be integrally formed with each other, and the second housing structure 520 and the second back cover 590 may be integrally formed with each other.

In the illustrated embodiment, the first housing structure 510 and the second housing structure 520 may be disposed on opposite sides of a folding axis (an axis A) and may have substantially symmetrical shapes with respect to the folding axis A. As will be described below, the angle or distance between the first housing structure 510 and the second housing structure 520 may vary depending on whether the electronic device 10 is in a flat, folded, or intermediate state.

In an embodiment, at least a part of the first housing structure 510 and the second housing structure 520 may be formed of metal or non-metal having strength selected to support the display 200.

In an embodiment, corresponding to a sensor area 550 of the display 200, various types of sensors (e.g., image sensor, illuminance sensor, infrared sensor) may be disposed. In order for the various types of sensors to irradiate light to outside of the electronic device or to collect light from outside of the electronic device, the sensor area 550 of the display 200 may form an opening. In this case, the display 200 may include an inner surface for forming the opening. Although FIG. 2A shows a circular opening, the opening may have various shapes. On the other hand, the display 200 may not have the opening for the sensors. In this case, since a camera detects light entering through the display 200, the display 200 may become transparent when the camera is operated.

The first back cover 580 may be disposed on one side of the folding axis A on the rear surface of the electronic device 10 and may have, for example, a substantially rectangular periphery that is surrounded by the first housing structure 510. Similarly, the second back cover 590 may be disposed on an opposite side of the folding axis A on the rear surface of the electronic device 10 and may have a periphery surrounded by the second housing structure 520.

In the illustrated embodiment, the first back cover 580 and the second back cover 590 may have substantially symmetrical shapes with respect to the folding axis (the axis A). However, the first back cover 580 and the second back cover 590 do not necessarily have symmetrical shapes, and in another embodiment, the electronic device 10 may include the first back cover 580 and the second back cover 590 in various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space in which various parts (e.g., a printed circuit board or a battery) of the electronic device 10 are disposed. In an embodiment, one or more parts may be disposed or visually exposed on the rear surface of the electronic device 10. For example, at least part of a sub-display 190 may be visually exposed through a first rear area 582 of the first back cover 580. In another embodiment, one or more parts or sensors may be visually exposed through a second rear area 592 of the second back cover 590. In various embodiments, the sensors may include a proximity sensor and/or a rear camera.

Referring to FIG. 2B, the hinge cover 530 may be disposed between the first housing structure 510 and the second housing structure 520 to hide internal parts (e.g., hinge structures). In an embodiment, the hinge cover 530 may be hidden by part of the first housing structure 510 and part of the second housing structure 520, or may be exposed to the outside, depending on a state (e.g., a flat state or a folded state) of the electronic device 10.

For example, when the electronic device 10 is in a flat state as illustrated in FIG. 2A, the hinge cover 530 may be hidden by the first housing structure 510 and the second housing structure 520 and thus may not be exposed. In another example, when the electronic device 10 is in a folded state (e.g., a fully folded state) as illustrated in FIG. 2B, the hinge cover 530 may be exposed between the first housing structure 510 and the second housing structure 520 to the outside. In another example, when the electronic device 10 is in an intermediate state in which the first housing structure 510 and the second housing structure 520 are folded with a certain angle, the hinge cover 530 may be partially exposed between the first housing structure 510 and the second housing structure 520 to the outside. However, in this case, the exposed area may be smaller than that when the electronic device 10 is in a fully folded state. In an embodiment, the hinge cover 530 may include a curved surface.

The display 200 may be disposed in the space formed by the foldable housing 500. For example, the display 200 may be mounted in the recess formed by the foldable housing 500 and may form almost the entire front surface of the electronic device 10.

Accordingly, the front surface of the electronic device 10 may include the display 200, and a partial area of the first housing structure 510 and a partial area of the second housing structure 520 that are adjacent to the display 200. The rear surface of the electronic device 10 may include the first back cover 580, a partial area of the first housing structure 510 that is adjacent to the first back cover 580, the second back cover 590, and a partial area of the second housing structure 520 that is adjacent to the second back cover 590.

The display 200 may refer to a display, at least a partial area of which is able to be transformed into a flat surface or a curved surface. In an embodiment, the display 200 may include a folding area 203, a first area 201 disposed on one side of the folding area 203 (on a left side of the folding area 203 illustrated in FIG. 2A), and a second area 202 disposed on an opposite side of the folding area 203 (on a right side of the folding area 203 illustrated in FIG. 2A).

The areas of the display 200 illustrated in FIG. 2A are illustrative, and the display 200 may be divided into a plurality of (e.g., four or more, or two) areas according to a structure or function of the display 200. For example, in the embodiment illustrated in FIG. 2A, the areas of the display 200 may be divided from each other by the folding area 203 or the folding axis (the axis A) that extends in parallel to the y-axis. However, in another embodiment, the display 200 may be divided into areas with respect to another folding area (e.g., a folding area parallel to the x-axis) or another folding axis (e.g., a folding axis parallel to the x-axis).

The first area 201 and the second area 202 may have substantially symmetrical shapes with respect to the folding area 203.

Hereinafter, operations of the first housing structure 510 and the second housing structure 520 and the areas of the display 200 according to states (e.g., a flat state and a folded state) of the electronic device 10 will be described.

In an embodiment, when the electronic device 10 is in a flat state (e.g., FIG. 2A), the first housing structure 510 and the second housing structure 520 may be arranged to face the same direction while forming an angle of 180 degrees. The surface of the first area 201 of the display 200 and the surface of the second area 202 thereof may face the same direction (e.g., face away from the front surface of the electronic device 10) while forming an angle of 180 degrees. The folding area 203 may form the same plane together with the first area 201 and the second area 202.

In an embodiment, when the electronic device 10 is in a folded state (e.g., FIG. 2B), the first housing structure 510 and the second housing structure 520 may be arranged to face each other. The surface of the first area 201 of the display 200 and the surface of the second area 202 thereof may face each other while forming a narrow angle (e.g., an angle between 0 degrees and 10 degrees). At least part of the folding area 203 may form a curved surface having a predetermined curvature.

In an embodiment, when the electronic device 10 is in an intermediate state (e.g., FIG. 2B), the first housing structure 510 and the second housing structure 520 may be arranged to have a certain angle therebetween. The surface of the first area 201 of the display 200 and the surface of the second area 202 thereof may form an angle that is greater than that in the folded state and is smaller than that in the flat state. At least part of the folding area 203 may form a curved surface having a predetermined curvature, and the curvature may be smaller than that in the folded state.

Figure 3:
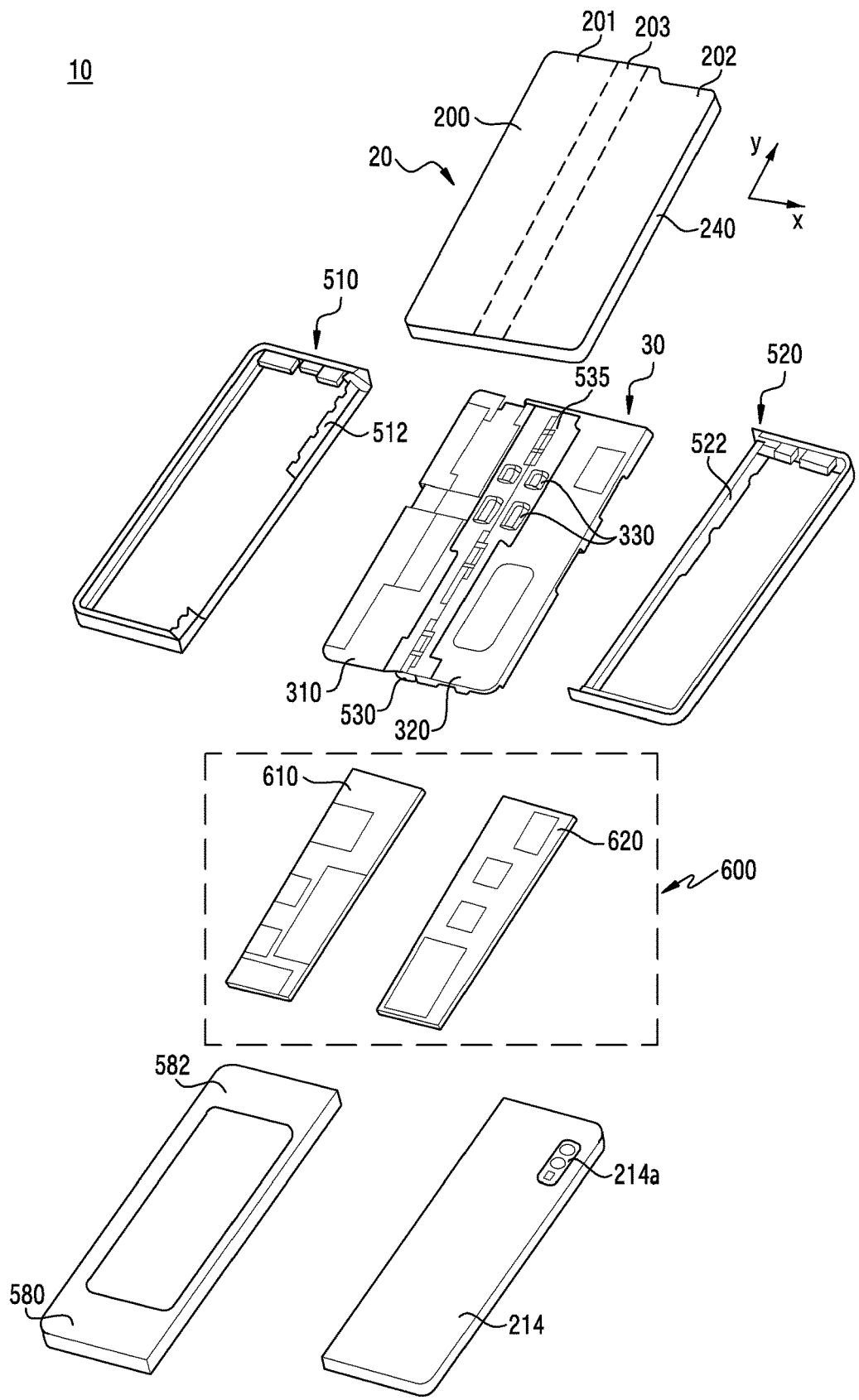
FIG. 3 is an exploded perspective view of an electronic device according to an embodiment.

FIG. 3 is an exploded perspective view of an electronic device according to an embodiment.

Referring to FIG. 3, in an embodiment, the electronic device 10 may include a display unit 20, a bracket assembly 30, a substrate 600, the first housing structure 510, the second housing structure 520, the first back cover 580, and the second back cover 590. In this disclosure, the display unit 20 may be referred to as the display module or the display assembly.

The display unit 20 may include the display 200 and at least one plate or layer 140 on which the display 200 is mounted. In an embodiment, the plate 140 may be disposed between the display 200 and the bracket assembly 30. The display 200 may be disposed on at least part of one surface (e.g., an upper surface with respect to FIG. 3) of the plate 140. The plate 140 may be formed in a shape corresponding to the display 200.

The bracket assembly 30 may include a first bracket 410, a second bracket 420, hinge structures 300 disposed between the first bracket 410 and the second bracket 420, the hinge cover 530 that covers the hinge structures 300 when viewed from the outside, and a wiring member 430 (e.g., a flexible printed circuit (FPC)) that traverses the first bracket 410 and the second bracket 420.

In an embodiment, the bracket assembly 30 may be disposed between the plate 140 and the substrate 600. For example, the first bracket 410 may be disposed between the first area 201 of the display 200 and a first substrate 610. The second bracket 420 may be disposed between the second area 202 of the display 200 and a second substrate 620.

In an embodiment, at least a part of the wiring member 430 and the hinge structures 300 may be disposed inside the bracket assembly 30. The wiring member 430 may be arranged in a direction (e.g., the x-axis direction) across the first bracket 410 and the second bracket 420. The wiring member 430 may be arranged in a direction (e.g., the x-axis direction) that is perpendicular to a folding axis (e.g., the y-axis or the folding axis A of FIG. 2A) of the folding area 203 of the electronic device 10.

As mentioned above, the substrate 600 may include the first substrate 610 disposed at the first bracket 410 side and the second substrate 620 disposed at the second bracket 420 side. The first substrate 610 and the second substrate 620 may be disposed in a space that is formed by the bracket assembly 30, the first housing structure 510, the second housing structure 520, the first back cover 580, and the second back cover 590. Parts for implementing various functions of the electronic device 10 may be mounted on the first substrate 610 and the second substrate 620.

The first housing structure 510 and the second housing structure 520 may be assembled so as to be coupled to opposite sides of the bracket assembly 30 in the state in which the display unit 20 is coupled to the bracket assembly 30. As will be described herein, the first housing structure 510 and the second housing structure 520 may slide on the opposite sides of the bracket assembly 30 and may be coupled with the bracket assembly 30.

In an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include curved surfaces that correspond to curved surfaces included in the hinge cover 530.

In an embodiment, when the electronic device 10 is in a flat state (e.g., the electronic device 10 of FIG. 1), the first rotation support surface 512 and the second rotation support surface 522 may cover the hinge cover 530 such that the hinge cover 530 is not exposed, or is exposed to a minimum, on the rear surface of the electronic device 10. Meanwhile, when the electronic device 10 is in a folded state (e.g., the electronic device 10 of FIG. 2), the first rotation support surface 512 and the second rotation support surface 522 may rotate along the curved surfaces included in the hinge cover 530, such that the hinge cover 530 is exposed on the rear surface of the electronic device 10 to the maximum.

An electronic device according to various embodiments disclosed herein may include various types of devices. The electronic device may include, for example, a portable communication device (e.g., a smartphone), a computer device, a portable multimedia device, a portable medical device, a camera, a wearable device, or a home appliance. The electronic device according to the embodiments disclosed herein is not limited to the foregoing devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element. As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Embodiments of FIG. 2A through FIG. 3 are to describe the operations or the structure of the foldable electronic device, and do not intent to limit the shape of the display, and the position of the camera or the sensor. Hereafter, various embodiments are explained, by referring to FIG. 4A through FIG. 10.

Figure 4A:
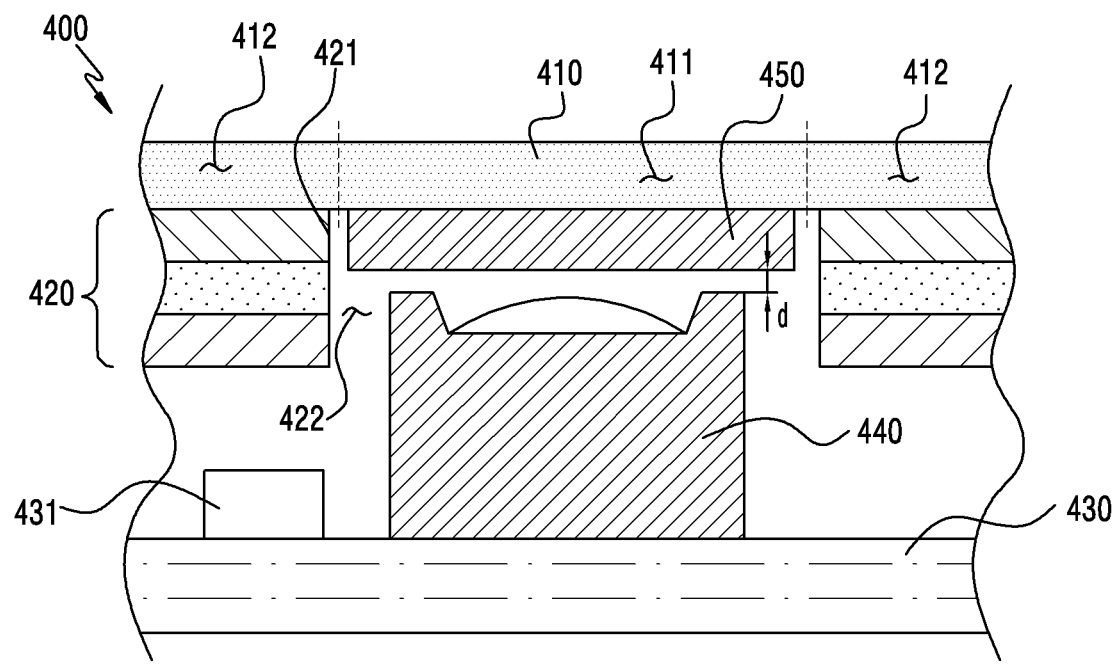
FIG. 4A is a cross-sectional view of an area including a camera module of an electronic device including a transparent member on a window rear surface according to an embodiment.

FIG. 4A is a cross-sectional view of an area including a camera module 440 of an electronic device (e.g., the electronic device 101 of FIG. 1) including a transparent member 450 on a window 410 rear surface according to an embodiment.

Referring to FIG. 4A, an electronic device 400 according to an embodiment may include the window 410 which forms an outer surface of the electronic device 400, a display 420 disposed beneath the window and including an opening 422, a printed circuit board 430 disposed below the display 420 and including an electronic part 431, the camera module 440 disposed on the printed circuit board 430 and disposed in an area corresponding to the opening 422 of the display 420, and the transparent member 450 disposed in an area corresponding to the camera module 440 of the window 410.

The window 410 may be disposed on the display 420 and protect the display 420 and the camera module 440 from an external impact. Since the window 410 in the foldable electronic device 400 is folded or unfolded according to folding or unfolding of the foldable electronic device 400, the window 410 may include a material having a flexible characteristic. For example, the window 410 may include polyimide (PI). If the window 410 is formed with a material (e.g., glass) of relatively high strength, the window 410 may have a slim thickness. For example, the window 410 may be formed with ultra-thin glass (UTG).

In an embodiment, the display 420 may be disposed beneath the window 410, and may be electrically connected to the printed circuit board 430 to output an image. In an embodiment, the display 420 may be connected to other printed circuit board than the printed circuit board 430 which is depicted. For example, the display 420 may be electrically connected to the printed circuit board through an electrical path (e.g., a flexible printed circuit board or a conductive line).

In an embodiment, at least one part of the camera module 440 may be positioned within the opening 422 of the display 420. The camera module 440 may gather electronic device external light through the window 410 and the opening 422. The display 420 may include an inner side surface 421 which forms the opening 422 for accommodating the camera module 440. For example, the display 420 may include a punching hole for accommodating the camera module 440 therein. In this case, the display 420 may not be disposed between the window 410 and the camera module 440.

While the camera module 440 is disposed on the printed circuit board 430 in FIG. 4A through FIG. 10, the embodiment of the present disclosure is not limited thereto, and the camera module 440 may be disposed on other structure in another embodiment. For example, the electronic device may include a plate disposed inside the housing, and the camera module 440 may be disposed on this plate.

While the display 420 includes therein the opening 422 for accommodating the camera module 440 in FIG. 4A through FIG. 10, the camera module 440 of the electronic device 10 according to another embodiment (not shown) may be disposed below the display 420 without a corresponding opening or punching hole. In this case, the display 420 may be disposed between the window 410 and the camera module 440, and some area of the display 420 corresponding to an angle of view area of the camera module 440 may become transparent if the user intends to acquire an image through the camera module 440. For example, the display 420 may be turned off while the camera module 440 acquires an image. Meanwhile, if the display 420 outputs an image, driving timing of the display 420 may include on duty and off duty. In this case, since the display may become transparent at the off duty timing of the driving timing of the display 420, the camera module 440 may acquire an image at the corresponding timing.

In an embodiment, if the camera module 440 of the electronic device 10 is disposed below the display 420, the display 420 may be configured such that some area (hereafter, an under display camera (UDC) area) corresponding to the angle of view of the camera module 440 (or a light sensor) has higher light transmittance than other area. For example, a pixel density of the UDC area of the display may be lower than other area. The slip may occur between the display 420 and the camera module 440 disposed below the display 440 according to the unfolding or the folding of the electronic device 10. The slip may cause a problem that the angle of view of the camera module 440 is not aligned to the UDC area of the display 420. In an embodiment, the UDC area of the display 420 may be formed in a size by considering the slip between the display 420 and the camera module 440.

The display 420 may include a plurality of layers. The plurality of the layers may be stacked through an adhesive member, compression, or deposition. For example, a first layer may be attached on a second layer through the adhesive member (not shown). The display 420 may include, for example, a color filter, a liquid crystal layer, a touch panel, a thin film encapsulation (TFE) layer, a thin film transistor (TFT) layer, and/or a polarizing layer.

According to an embodiment, the camera module 440 may be disposed right beneath the window 410. Although not depicted, the camera module 440 may be disposed beneath the display 420. The window 410 or the display 420, which may be thin or flexible, of the electronic device 10 may be vulnerable to deformation by an external force. Hence, the electronic device 10 may be designed such that the structure or the electronic part inside the electronic device 10 supports the window 410 or the display 420 of the electronic device. For example, if the user of the electronic device 10 presses some area of the window 410, the internal structure of the electronic device 10 may support the window 410 to present the window 410 from sagging. However, to prevent the impact applied to the camera module 440 through the window 410 or the display 420, it is necessary to limit supporting the window 410 or the display 420 through the camera 440. For example, if a load is applied to the area corresponding to the camera module 440 of the window 410, the window 410 of the corresponding area may deform towards the camera module 440 to interfere with the camera module 440. If the window 410 or the display 420 interferes with the camera module 440, the window 410, the display 420, and/or the camera module 440 may be damaged or the image quality acquired through the camera module 440 may be degraded. It is required to avoid supporting the window 410 (or the display 420) through the camera module 440, and to prevent the window 410 (or the display 420) from colliding with the camera module 440.

According to an embodiment, at least part (e.g., a lens portion of the camera module) of the camera module 440 may be positioned in the opening 422 of the display 420, and spaced from a surface facing the camera module 440 of the window 410. According to another embodiment (not shown), the display 420 of the electronic device 10 may not include the opening 422 for the camera module 440, wherein at least part (e.g., a lens portion of the camera module) of the camera module 440 may be disposed below the display 420, and spaced from the surface facing the camera module 440 of the display 420. Since the camera module 440 is spaced from the window 410 or the display 420, the window 410, the display 420, and/or the camera module 440 may be protected from the external impact. Thus, the quality of the image acquired through the camera module 440 may be maintained.

The window 410, which is more flexible than a general electronic device (hereafter, a 'conventional device') having no flexible display, may be more vulnerable to the deformation by the external force in the foldable electronic device 400. Hence, a separation distance d between the window 410 and the camera module 440 may be designed to be greater than the conventional device. For example, in the conventional device, the spacing between the window 410 and the camera module 440 may be short because the window 410 may be formed with a relatively thick glass, but the spacing d between the window 410 and the camera module 440 may be longer than the conventional device, because the window 410 is thin in the foldable electronic device 400. The electronic device 400 according to an embodiment may dispose an adequate protection member in the space between the window 410 and the camera module 440, and thus efficiently utilize the inner space of the electronic device 400 and protect the camera module 440 without increasing the thickness of the electronic device 400. While the relationship between the window 410 and the camera module 440 of the electronic device 10 having the display 420 including the opening 422 corresponding to the camera module 440 has been described for the sake of explanations, it may be applied in the same manner between the display 420 and the camera module 440 of the electronic device having the display 420 not including the opening 422 to the camera module 440.lo According to an embodiment, the transparent member 450 may be attached to a first area 411 corresponding to the camera module 440 of the window 410. The transparent member 450 may prevent the window 410 from being deformed by the external force over the distance d spaced between the window 410 and the camera module 440 and exerting the impact on the camera module 440. If the transparent member 450 is attached to the first area 411, since the load applied to the first area of the window 410 is dispersed to the window 410 and the transparent member 450, the deformation of the window 410 by the external force may be mitigated in the first area 411 of the window 410. For example, if the transparent member 450 is attached to the first area 411, the transparent member 450 may bear some of the load applied to the first area of the window 410. The transparent member 450 may minimize or prevent permanent deformation or damage of the window 410 by the external force exerted on the opening 422 portion of the display 420. Further, the transparent member 450 may prevent interference between the window 410 and the camera module 440.

According to an embodiment, since the window 410 is vulnerable to the deformation as the thickness of the window 410 reduces, the thickness of the transparent member 450 for protecting the window 410 and the camera module 440 may increase. According to another embodiment, the window 410 may integrally formed with the transparent member 450. For example, the thickness of the portion corresponding to the camera module 440 may be formed thick if the window 410 is formed.

According to an embodiment, the transparent member 450 may be attached to the back surface of the window 410. The transparent member 450 may be disposed in a portion (e.g., the first area 411) corresponding to the opening 422 of the display 420 of the window 410. According to an embodiment, the transparent member 450 may be formed to be smaller than the size of the opening 422 of the display 420 and spaced from the inner side surface 421 which forms the opening 422 of the display 420. The transparent member 450 attached to the back surface of the window 410 may be spaced from the camera 440 by the specific distance d. According to an embodiment, the distance of the transparent member 450 separated from the camera module 440 may be about 0.1 mm through about 0.2 mm.

According to another embodiment, the transparent member 450 may be formed to be greater than the size of the opening 422 of the display 420, to cover a wider area than the area corresponding to the opening 422 of the window 410. For example, the transparent member 450 may be formed in the form of a film and attached to the back surface of the window 410. If the transparent member 450 is attached in the form of the film to the back surface of the window 410, a manufacturing process may be easier than attaching the transparent member 450 to the area corresponding to the opening 422 of the display 420 of the window 410. It may be more advantageous in the manufacturing process to dispose the transparent member 450 in the wider area than the opening 422 of the display 420, than disposing the transparent member 450 to precisely match the opening 422 of the display 420 in the process of stacking the window 410 and the display 420.

An additional member or a coating layer (not shown) for index matching may be disposed between the window 410 and the transparent member 450. The light coming from the outside of the electronic device 10 into the camera module 440 may be weakened in intensity due to total reflection which occurs in the incidence from the window 410 to the transparent member 450. Hence, the index matching which may reduce the refraction index difference between the window 410 and the transparent member 450 to some degree may be required.

Figure 4B:
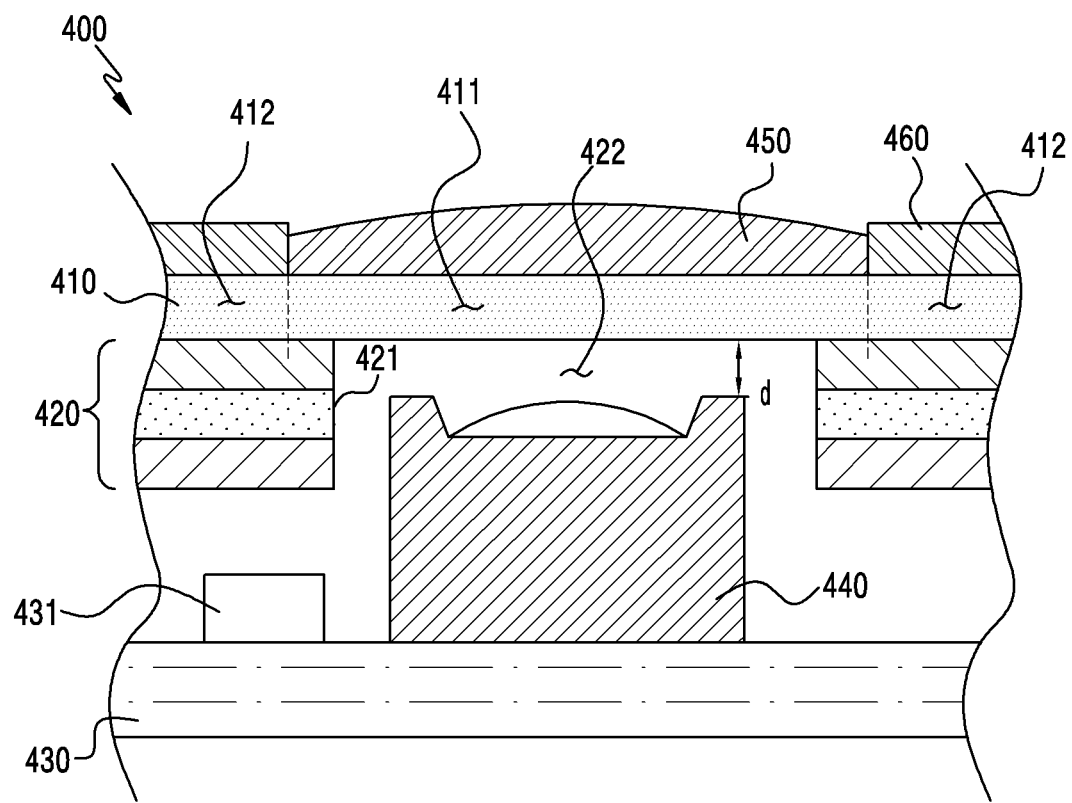
FIG. 4B is a cross-sectional view of the area including the camera module of the electronic device including the transparent member on the window front surface according to an embodiment.

FIG. 4B is a cross-sectional view of the area including the camera module 400 of the electronic device (e.g., the electronic device 101 of FIG. 1) including the transparent member 450 on the window 410 front surface according to an embodiment.

Referring to FIG. 4B, the electronic device according to an embodiment may include the transparent member 450 disposed on the front surface of the window 410. Since the transparent member 450 is disposed in the first area 411 of the window 410, the strength of the first area 411 of the window 410 may be improved. If the transparent member 450 is attached to the first area 411, the deformation degree by the external force in the first area 411 of the window 410 may be reduced. The deformation of the window 410 may be mitigated because the load applied to the first area of the window 410 is dispersed to the window 410 and the transparent member 450.

The transparent member 450 according to an embodiment may be formed to be greater than the opening 422 of the display 420, to cover the wider area than the area corresponding to the opening 422 of the window 410. If the transparent member 450 is greater than the opening 422, the deformation of the first area 411 of the window 420 may be further mitigated. Since a perimeter of the transparent member 450 and a perimeter adjacent to the inner side surface 421 of the display 420 overlap, the display 420 may support the load applied to the transparent member 450.

If the transparent member 450 is attached to the front surface of the window 410, the front surface of the electronic device may include a step between the first area 411 to which the transparent member 450 is attached and a second area 412 to which the transparent member 450 is not attached. If the front surface of the electronic device has the step, it may negatively affect aesthetic or usability of the electronic device. According to an embodiment, the electronic device may include an additional transparent member 460 disposed in the second area 412. In an embodiment, the additional transparent member 460 may include an opening for accommodating the transparent member 450. In an embodiment, the additional transparent member 460 may be formed in a similar thickness to the transparent member 450 disposed in the first area 411 to minimize the step of the front surface of the electronic device. According to another embodiment, the transparent member 450 may be integrally formed with the additional transparent member 460. In this case, the thickness of the transparent member 450 corresponding to the first area 411 may be greater than the thickness of the transparent member 450 corresponding to the second area 412.

According to an embodiment, since the transparent member 450 is disposed in the area corresponding to the camera module 440 of the window 410, it is possible to not only protect the window 440 but also prevent the permanent deformation of the window 410. Since the hollow space exists between the window 410 and the camera module 440, if the external force is applied to the area (e.g., the first area 411) corresponding to the camera module 440 of the window 410, the window 410 may sag. If the deformation of the window 410 exceeds an elastic limit, the permanent deformation may occur to the window 410. If the window 410 has the permanent deformation, the window surface may become uneven to spoil the exterior of the electronic device. According to an embodiment, the electronic device 400 including the transparent member 450 may maintain the quality of the exterior of the electronic device 400, by preventing the permanent deformation of the window 410.

Figure 5A:
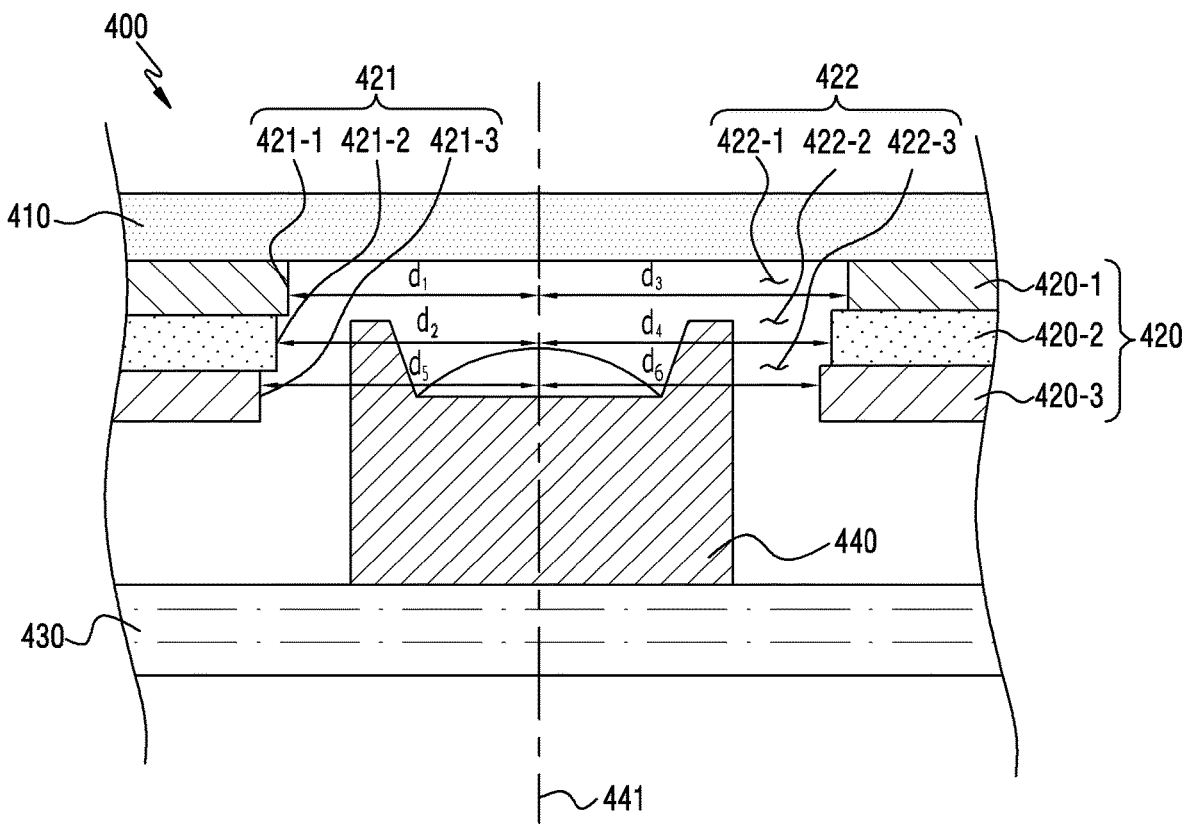
FIG. 5A is a cross-sectional view of an area including a camera module of an electronic device including a display according to an embodiment.
Figure 5B:
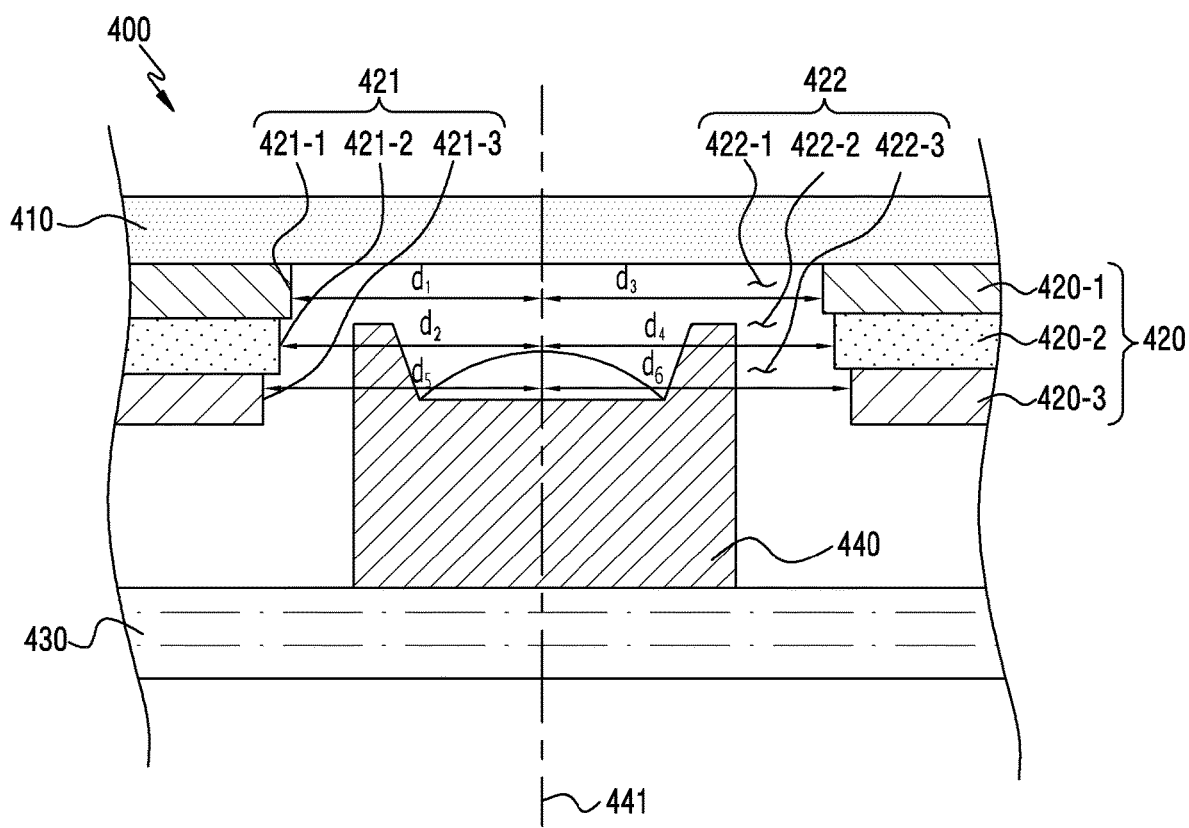
FIG. 5B is a cross-sectional view of the area including the camera module of the electronic device including the display according to an embodiment.

FIG. 5A and FIG. 5B are cross-sectional views of an area including a camera module 440 of an electronic device (e.g., the electronic device 101 of FIG. 1) including a display 420 according to an embodiment.

Referring to FIG. 5A and FIG. 5B, the camera 440 of the electronic device 400 according to an embodiment may include the opening 422 formed by the internal side surface 421 of the display 420. If the camera module 440 is disposed inside (e.g., in the opening 422) the display 420, the outer side surface of the camera module 440 may be spaced from the inner side surface 421 of the display 420. As the camera module 440 may be spaced from the display 420, interference with the display 420 may be prevented.

According to an embodiment, the display 420 may include a plurality of layers 420-1, 420-2, and 420-3. For example, the first layer 420-1 may be an adhesive layer (e.g., pressure sensitive adhesive (PSA)), the second layer 420-2 may be a polarizing layer, and the third layer 420-3 may be a display panel. The display 420 includes the three layers in the drawings of the present disclosure, which is for the sake of explanations, and the display 420 may include four or more layers. For example, the display 420 may further include a touch film disposed between the window and the polarizing layer.

Inner side surfaces 421-1, 421-2, and 421-3 for receiving the camera module 440 may be formed in the plurality of the layers 420-1, 420-2, and 420-3 respectively. The inner side surfaces 421-1, 421-2, and 421-3 may form openings 422-1, 422-2, and 422-3 respectively for receiving the camera module 440. A manufacturer may form the openings 422-1, 422-2, and 422-3 in the plurality of the layers 420-1, 420-2, and 420-3 respectively, and then manufacture the display 420 by stacking the plurality of the layers 420-1, 420-2, and 420-3. If the openings 422-1, 422-2, and 422-3 are formed inside the plurality of the layers 420-1, 420-2, and 420-3 and then stacked, the shape of the opening 422 of the display 420 may be formed variously. For example, the shapes of the openings 422-1, 422-2, and 422-3 formed in some or all of the plurality of the layers 420-1, 420-2, and 420-3 may differ from one another. As another example, the sizes of the openings 422-1 and 422-3 in the outermost layers 420-1 and 420-3 of the display 420 may be smaller than the size of the opening 422-2 in the inner layer 420-2 of the display 420. As yet another example, the sizes of the openings 422-1, 422-2, and 422-3 formed in the plurality of the layers 420-1, 420-2, and 420-3 of the display 420 may increase or decrease as going down. As still another example, central axes of the plurality of the openings 422-1, 422-2, and 422-3 formed in the plurality of the layers 420-1, 420-2, and 420-3 may not match.

According to an embodiment, the plurality of the layers may include the first layer 420-1 disposed beneath the window 410, the second layer 420-2 disposed beneath the first layer 420-1 and the third layer 420-3 disposed beneath the second layer 420-2. The first layer 420-1, the second layer 420-2, and the third layer 420-3 may directly contact without additional intermediate layers, and other layer may be further included between them. For example, the second layer 420-2 may be disposed beneath the first layer 420-1, and the third layer 420-3 may be disposed lower than the second layer 420-2 based on at least one layer therebetween. While the relations of the first layer 420-1, the second layer 420-2, and the third layer 420-3 are described hereafter for the sake of explanations, the identical/corresponding technical method may be applied even if an additional layer is disposed between the layers.

The first layer 420-1 may include the first inner side surface 421-1 and the first opening 422-1 formed by the first inner side surface 421-1. The second layer 420-2 may include the second inner side surface 421-2 and the second opening 422-2 formed by the second inner side surface 421-2. The third layer 420-3 may include the third inner side surface 421-3 and the third opening 422-3 formed by the third inner side surface 421-3. The first inner side surface 421-1, the second inner side surface 421-2 and the third inner side surface 421-3 may form the inner side surface 421 of the display 420. The first opening 422-1, the second opening 422-2 and the third opening 422-3 may form the opening 422 of the display 420. The first opening 422-1, the second opening 422-2 and the third opening 422-3 may be formed in the area corresponding to the camera module 440. For example, the camera module 440 may intersect the surface including the first layer 420-1, the second layer 420-2, and the third layer 420-3. The first opening 422-1, the second opening 422-2 and/or the third opening 422-3 may be formed not to interfere with the camera module 440. The first inner side surface 421-1, the second inner side surface 421-2 and the third inner side surface 421-3 may be spaced from the camera module 440.

If the electronic device 400 is unfolded or folded, the plurality of the layers 420-1, 420-2, and 420-3 may be slipped with respect to their neighboring layer. For example, an adhesive layer (not shown) may be disposed between the plurality of the layers 420-1, 420-2, and 420-3, and the adhesive layer (not shown) may bond two neighboring layers. Since the adhesive layer (not shown) does not completely combine the two neighboring layers, one of two neighboring layers may move to some degree in a direction parallel to the surface with respect to the other layer. That is, the plurality of the layers 420-1, 420-2, and 420-3 each may be relatively slipped with respect to the neighboring layer.

If the slip occurs between the plurality of the layers 420-1, 420-2, and 420-3, the opening 422 accommodating the camera module 440 may be deformed. The shape of the opening 422 formed by the first inner side surface 421-1, the second inner side surface 421-2 and the third inner side surface 421-3 may differ in the folded state and the unfolded state of the electronic device 400. For example, if the opening 422 has a cylindrical shape in the folded state of the electronic device 400, if the electronic device 400 is unfolded, the opening 422 may have a tilted cylindrical shape. As another example, the opening 422 may have a cylindrical shape if the electronic device 400 is unfolded, and the opening 422 may have a tilted cylindrical shape if the electronic device 400 is folded.

The plurality of the layers 420-1, 420-2, and 420-3 is slipped, and may interfere with the camera module 440 disposed in the opening 422 of the display 420. For example, if the electronic device 400 changes from a first state (e.g., folded) to a second state (e.g., unfolded), and a slip distance of the plurality of the layers 420-1, 420-2, and 420-3 exceeds the spaced distance between the inner side surfaces 421-1, 421-2, and 421-3 of the plurality of the layers 420-1, 420-2, and 420-3 and the camera module 440 in the first state of the electronic device 400, the inner side surface 421 of the display 420 may collide with the camera module 440 in the second state of the electronic device 400. Even if the opening 422 is formed not to cause the camera module 440 interfere with the display 420 in the folded state (or the unfolded state), the camera module 440 may interfere with the display 420 in the unfolded state (or the folded state).

If the camera module 440 is interfered with the display 420 and impacted, the camera module 440 may not be aligned at a designed position. For example, if the camera module 440 is shaken by the external impact, a central axis of a lens of the camera module 440 may move. Also, as the camera module 440 is interfered with the display 530, the display 420 may be damaged as well as the camera module 440. Since the quality of the image acquired through the camera module 440 may degrade if the camera module 440 is shaken or damaged, it is necessary to prevent the interference between the camera module 440 and the display 420.

According to an embodiment, to prevent the interference between the camera module 440 and the display 420, the plurality of the openings 422-1, 422-2, and 422-3 may be formed on the plurality of the layers 420-1, 420-2, and 420-3 by considering the slip, from the manufacturing of the display 420.

Meanwhile, the slip distance of the plurality of the layers 420-1, 420-2, and 420-3 may differ. For example, if the electronic device 400 changes from the first state (e.g., the unfolded state) to the second state (e.g., the folded state), one side of the plurality of the inner side surfaces 421-1, 421-2, and 421-3 of the display 420 may be slipped to approach the camera module 440. In this case, the slip distance of the one side of the third inner side surface 421-1 toward the camera module 440 may be longer than the slip distance of the one side, corresponding to the one side of the third inner side surface 421-3, of the second inner side surface 421-2 toward the camera module 440. Hence, the inner side surface 421 of the display 420, which does not interfere with the camera module 440 in the first state, may be interfered in the second state, and the interference degree of the camera module 440 may be greater in the third inner side surface 421-3 than the second inner side surface 421-2. According to an embodiment, to avoid the collision of the display 420 and the camera module 440 in the second state, a distance d3 between one side corresponding to the one side of the first inner side surface 421-1, of the second inner side surface 421-2 and a central axis 441 of the camera module 440 may be longer than a distance d1 between the one side of the first inner side surface 421-1 and the central axis 441 of the camera module 440, and a distance d5 between one side corresponding to the one side of the first inner side surface 421-1, of the third inner side surface 421-3, and the central axis 441 of the camera module 440 may be longer than the distance d3 between the one side corresponding to the one side of the first inner side surface 421-1, of the second inner side surface 421-3, and the central axis 441 of the camera module 440. Referring to FIG. 5A, according to an embodiment, the plurality of the layers 420-1, 420-2, and 420-3 of the display 420 may be stacked such that one side of the plurality of the inner side surfaces 421-1, 421-2, and 421-3 is tilted to right. According to another embodiment, if the plurality of the layers 420-1, 420-2, and 420-3 is stacked, the plurality of the openings 422-1, 422-2, and 422-3 may be formed on the plurality of the layers 420-1, 420-2, and 420-3 such that one side of the plurality of the inner side surfaces 421-1, 421-2, and 421-3 is tilted to right. While the opening 422 is inclined to the right in FIG. 5A, which is not limited thereto, it may be inclined to left according to the slip direction of the display 420.

Meanwhile, while both sides of the opening 422 are formed to have the same slope in FIG. 5A, they may be formed to have different slops. Referring to FIG. 5B, if one side of the plurality of the inner side surfaces 421-1, 421-2, and 421-3 has the shape inclined to the right (i.e., a positive slope), the other side of the plurality of the inner side surfaces 421-1, 421-2, and 421-3 may have the shape inclined to the left (i.e., a negative slope). In other words, the distance between the plurality of the inner side surfaces 421-1, 421-2, and 421-3 of the plurality of the layers 420-1, 420-2, and 420-3 and the central axis 441 of the camera module 440 may increase as the layer is disposed below farther from the window 410. For example, a distance d4 between one side corresponding to the one side of the first inner side surface 421-1, of the second inner side surface 421-2, and the central axis 441 of the camera module 440 may be longer than a distance d2 between the one side of the first inner side surface 421-1 and the central axis 441 of the camera module 440, and a distance d6 between one side corresponding to the one side of the first inner side surface 421-1, of the third inner side surface 421-3, and the central axis 441 of the camera module 440 may be longer than the distance d4 between the one side corresponding to the one side of the first inner side surface 421-1, of the second inner side surface 421-2, and the central axis 441 of the camera module 440. In this case, the slope of the one side of the plurality of the inner side surfaces 421-1, 421-2, and 421-3 approaching the camera module 440 if the electronic device 400 is changed from the first state to the second state, may be more gentle than the slope of the other side of the plurality of the inner side surfaces 421-1, 421-2, and 421-3 getting away from the camera module 440, in the first state of the electronic device 400. Referring to FIG. 5B, the step (e.g., 'd3-d1', 'd5-d3') between the one sides of the plurality of the inner side surfaces 421-1, 421-2, and 421-3 may be greater than the step (e.g., 'd4-d2', 'd6-d4') between the other sides of the plurality of the inner side surfaces 421-1, 421-2, and 421-3.

If the display 420 is formed by considering the slip according to an embodiment, the electronic device 400 changes to the second state and may not interfere with the camera module 440 even though the plurality of the layers 420-1, 420-2, and 420-3 is slipped. For example, even if the electronic device 400 changes from the first state to the second state and the one side of the third inner side surface 421-3 approaches the camera module 440 by the slip, since it is away from the camera module 440 by the distance considering the slip in the first state, the third inner side surface and the camera module 440 may not interfere.

According to an embodiment, the plurality of the openings 422-1, 422-2, and 422-3 may be formed such that the one sides of the plurality of the inner side surfaces 421-1, 421-2, and 421-3 getting away from the camera module 440 corresponds to the other sides of the plurality of the inner side surfaces 421-1, 421-2, and 421-3 approaching the camera module 440 if the electronic device 400 changes from the first state to the second state. For example, referring to FIG. 5A, if the one sides of the plurality of the inner side surfaces 421-1, 421-2, and 421-3 have the shape inclined to the right, the other sides of the plurality of the inner side surfaces 421-1, 421-2, and 421-3 may also have the shape inclined to the right. According to an embodiment, the distance d1 from the central axis 441 of the camera module 440 to a first side of the first inner side surface 421-1 may be shorter than the distance d3 from the central axis 441 of the camera module 440 to a second side corresponding to the first side of the second inner side surface 421-2, the distance d2 from the central axis 441 of the camera module 440 to one side opposite to the first side of the first inner side surface 421-1 may be longer than the distance d4 from the central axis 441 of the camera module 440 to one side opposite to the second side of the second inner side surface 421-2, the distance d3 from the central axis 441 of the camera module 440 to the second side of the second inner side surface 421-2 may be shorter than the distance d5 from the central axis 441 of the camera module 440 to a third side corresponding to the second side of the second inner side surface 421-2, and the distance d4 from the central axis 441 of the camera module 440 to one side opposite to the second side of the second inner side surface 421-2 may be longer than the distance d6 from the central axis 441 of the camera module 440 to one side opposite to the third side of the third inner side surface 421-3.

While FIG. 5 illustrates the embodiment in which the opening 422 of the display 420 is inclined to the right, the opening 422 of the display 420 may be formed in a shape inclined to the left. For example, the central axis of the first opening 422-1 may be spaced to the left with respect to the central axis of the second opening 422-2, and the central axis of the second opening 422-2 may be spaced to the left with respect to the central axis of the third opening 422-3. According to an embodiment, the distance d1 from the central axis 441 of the camera module 440 to the first side of the first inner side surface 421-1 may be longer than the distance 3 from the central axis 441 of the camera module 440 to the second side corresponding to the first side of the second inner side surface 421-2, the distance d2 from the central axis 441 of the camera module 440 to the one side opposite to the first side of the first inner side surface 421-1 may be shorter than the distance 4 from the central axis 441 of the camera module 440 to the one side opposite to the second side of the second inner side surface 421-2, the distance 3 from the central axis 441 of the camera module 440 to the second side of the second inner side surface 421-2 may be longer than the distance 5 from the central axis 441 of the camera module 440 to the third side corresponding to the second side of the second inner side surface 421-2, and the distance 4 from the central axis 441 of the camera module 440 to the one side opposite to the second side of the second inner side surface 421-2 may be shorter than the distance 6 from the central axis 441 of the camera module 440 to the one side opposite to the third side of the third inner side surface 421-3.

According to an embodiment, the first direction distance d1 which is perpendicular to the central axis 411 of the camera module 440 from the central axis 441 of the camera module 440 to the first inner side surface 421-1 may be shorter than the first direction distance d2 from the central axis 441 of the camera module 440 to the second inner side surface 421-2, and the second direction distance d3 which is opposite to the first direction from the central axis 441 of the camera module 440 to the first inner side surface 421-1 may be longer than the second direction distance d4 from the central axis 441 of the camera module 440 to the second inner side surface 421-2. According to an embodiment, the first direction and the second direction may be perpendicular to not only the central axis 441 of the camera module 440 but also a folding axis of the electronic device 400.

According to an embodiment, in the first layer 420-1, the first direction distance d1 or the second direction distance d2 may be the distance from the central axis 441 to the farthest or closest portion from or to the folding axis of the electronic device 400 in the first inner side surface 421-1. In the second layer 420-2 according to an embodiment, the first direction distance d3 or the second direction distance d4 may be the distance from the central axis 441 to the farthest or closest portion from or to the folding axis of the electronic device 400 in the second inner side surface 421-2. Since the slip degree of the display 420 may be maximum on the line vertical to the folding axis of the electronic device 400, if the opening 422 of the display 420 is formed based on the farthest or closest portion from or to the folding axis of the electronic device 400, the interference between the camera module 440 and the inner side surface 421 of the display 420 may be prevented stably.

Figure 6:
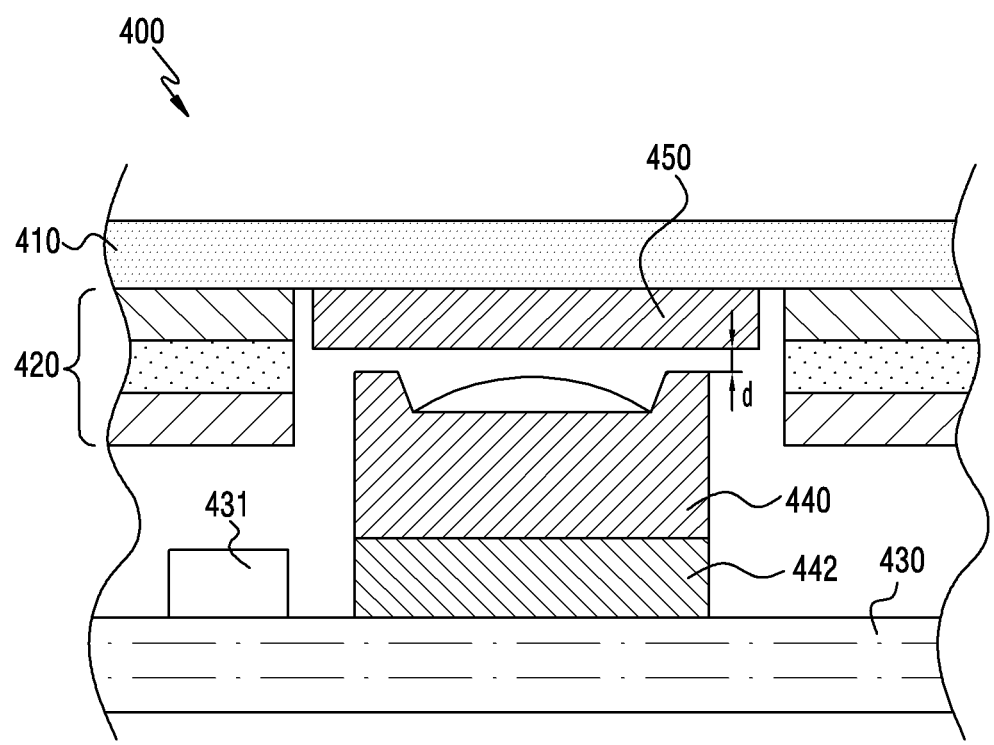
FIG. 6 is a cross-sectional view of an area including a camera module of an electronic device including a camera module reinforcing structure according to an embodiment.

FIG. 6 is a cross-sectional view of an area including a camera module 440 of an electronic device (e.g., the electronic device 101 of FIG. 1) including a reinforcing structure 442 of the camera module 440 according to an embodiment.

Referring to FIG. 6, the camera module 440 may be disposed on the printed circuit board 430. The camera module 440 may be impacted by the interference with the window 410 or the interference with the display 420. If the camera module 440 is impacted, the position of the camera module 440 on the printed circuit board 430 may be changed. If the camera module 440 is shaken or is not stably secured, the image quality acquired through the camera module 440 may be degraded. If the camera module 440 receives repetitive loads by the window 410 and the display 420, it may detach from the printed circuit board 430.

According to an embodiment, the camera module 440 may include the reinforcing structure 442. The reinforcing structure 442 of the camera module 440 may be disposed between the printed circuit board 430 and the camera module 440. The reinforcing structure 442 may firmly attach the camera module 440 to the printed circuit board 430, thus protecting the camera module 440 from an external impact. According to another embodiment, the camera module 440 may be manufactured to have high strength at a portion connected to the printed circuit board 430.

Figure 7:
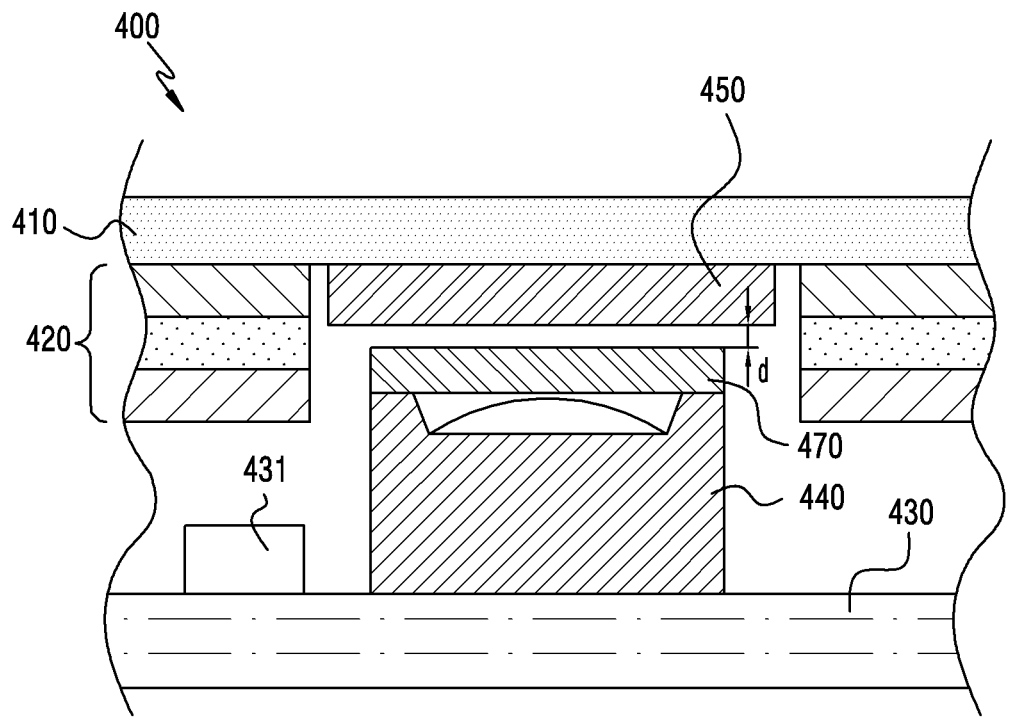
FIG. 7 is a cross-sectional view if a camera module of an electronic device includes a transparent member according to an embodiment.

FIG. 7 is a cross-sectional view if a camera module 440 of an electronic device (e.g., the electronic device 101 of FIG. 1) includes a transparent member 470 according to an embodiment.

Referring to FIG. 7, the camera module 440 according to an embodiment may include the transparent member 470 mounted on a camera lens. One surface of the transparent member 470 may face the camera lens, and the other surface may face the window 410. In an embodiment, the transparent member 470 may be spaced from the transparent member 450 attached to the rear surface of the window 410 by a certain distanced. The transparent member 470 may be disposed between the camera module 440 and the window 410 to protect the camera module 440. If a load is applied to the area corresponding to the camera module 440 of the window 410, the transparent member 470 may prevent the window 410 from impacting the camera module 440. Even if the window 410 impacts the camera module 440, the transparent member 470 may protect the camera module 440 by absorbing some of the impact transferred through the window 410 and preventing the window 410 and the camera module 440 from directly colliding with each other.

According to an embodiment, a coating layer (an anti reflection (AR) coating layer) for preventing reflection may be formed on a surface of the transparent member 470. If the surface of the transparent member 470 includes the AR coating layer, transmittance and visibility of the light radiated to the camera module 440 may be raised by preventing the light radiated from outside from reflecting back to the outside. Thanks to the AR coating layer, aesthetic of the area including the camera module 440 may be improved.

Figure 8A:
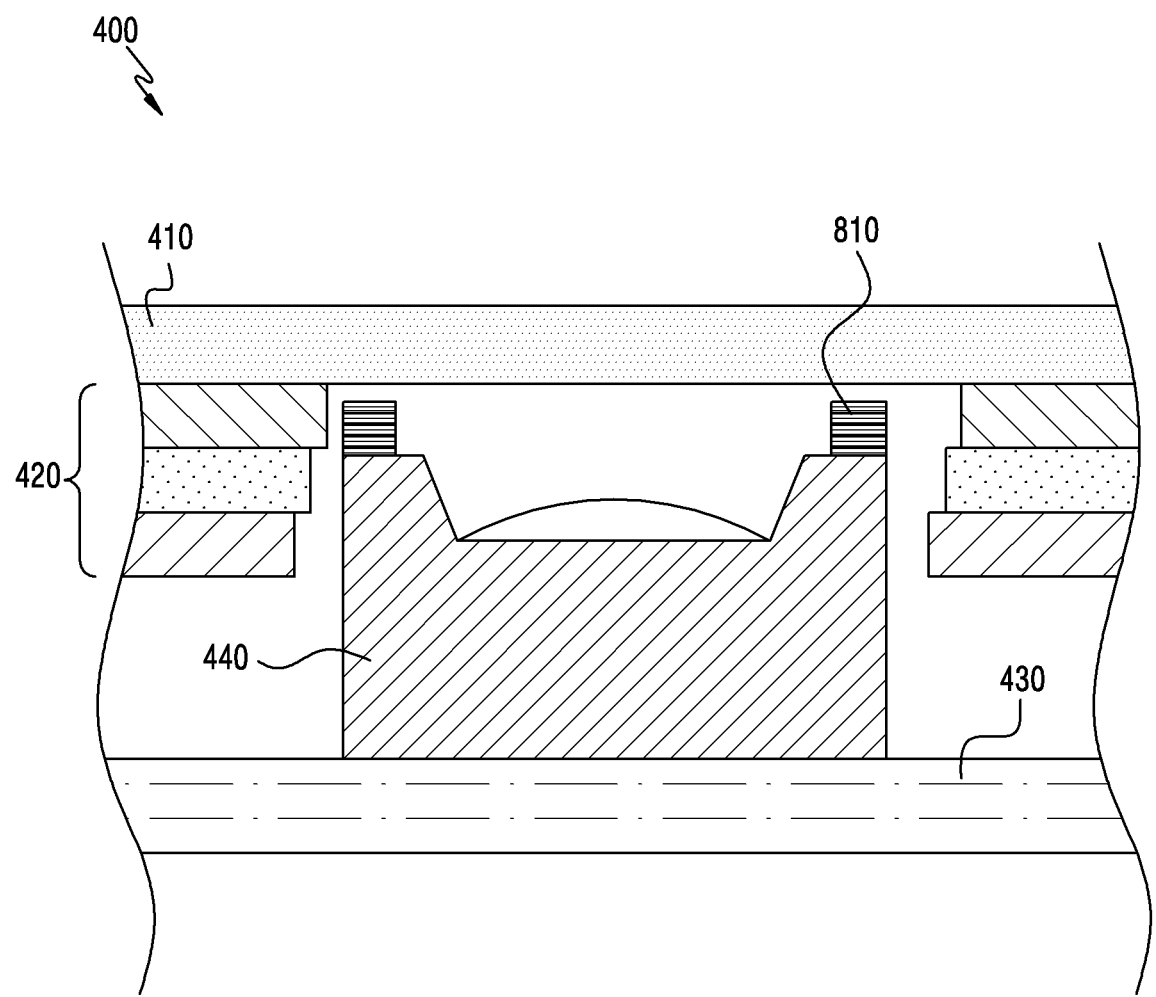
FIG. 8A is a cross-sectional view of an area including a camera module of an electronic device including a damping member for the camera module, according to a first embodiment.
Figure 8B:
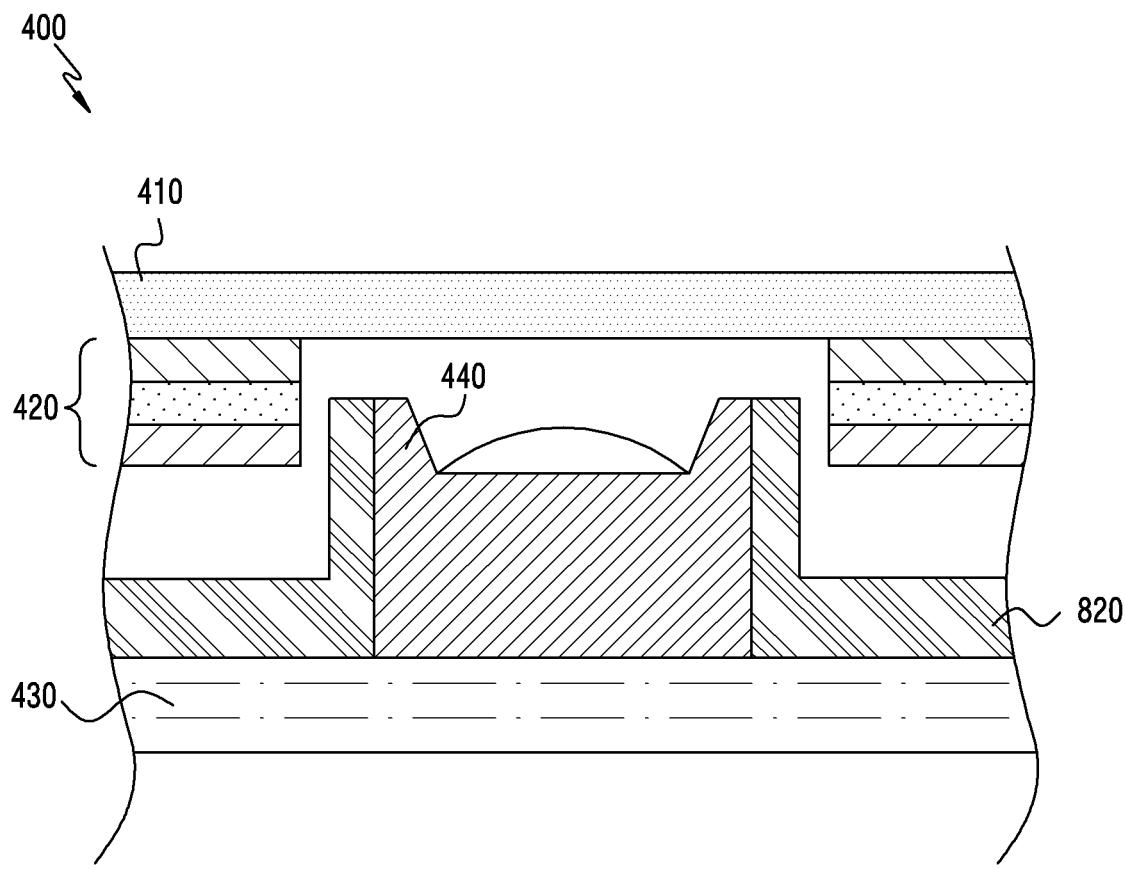
FIG. 8B is a cross-sectional view of the area including the camera module of the electronic device including the damping member for the camera module, according to a second embodiment.
Figure 8C:
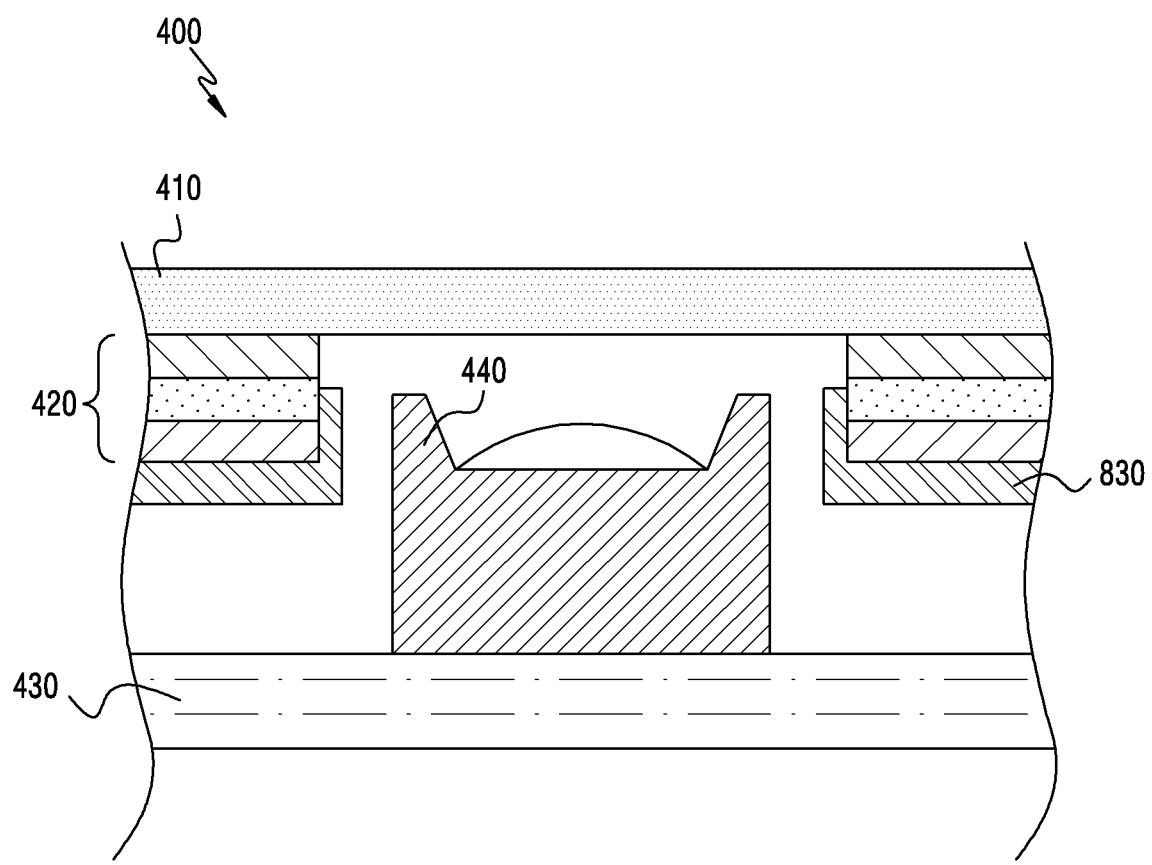
FIG. 8C is a cross-sectional view of the area including the camera module of the electronic device including the damping member for the camera module, according to a third embodiment.

FIG. 8A through FIG. 8C are cross-sectional views of an area including a camera module 440 of an electronic device (e.g., the electronic device 101 of FIG. 1) including damping members 810, 820, and 830 for the camera module 440.

Referring to FIG. 8A, the electronic device according to an embodiment may include the first damping member 810 between the camera module 440 and the window 410. In an embodiment, the first damping member 810 may be attached to the window 410 or the camera module 440. In an embodiment, the first damping member 810 may have a shape surrounding a perimeter of the camera lens. For example, the first damping member 810 may be disposed along edges of an upper surface (or the surface facing the window) of the camera module 440. Even if the window 410 sags and impacts the camera module 440, the first damping member 810 may primarily receive the impact, thus reducing an impulse to the camera module 440. According to an embodiment, the first damping member 810 may include an elastic material to mitigate the impact between the 410 and the camera module 440.

Referring to FIG. 8B and FIG. 8C, the electronic device according to an embodiment may include the second damping member 820 or the third damping member 830 between the camera module 440 and the display 420. The second damping member 820 or the third damping member 830 may be disposed between the camera module 440 and the display 420 to protect the camera module 440. The second damping member 820 or the third damping member 830 may protect the camera module 440 and the display 420 from the impact due to the interference between the display 420 and the camera module 440 occurring according to the slip of the plurality of the layers of the display 420. A height of the second damping member 820 may be higher than or equal to the camera module 440. According to an embodiment, the second damping member 820 may be integrally formed with the camera module 440. In this case, the second damping member 820 may form a housing of the camera module 440.

The second damping member 820 may be implemented as a structure which accommodates the camera module 440 in an embodiment. For example, the second damping member 820 may be a bracket or a frame including a groove for accommodating the camera module 440.

According to an embodiment, the third damping member 830 may cover whole or at least part of the inner side surface 421 of the opening 422 formed in the display 420, and may cover up to the inner side surface of the layer disposed at the lowest end, for example, the inner side surface 421-3 of the third layer 420-3 by considering the interference of the display 420 and the camera module 440. According to another embodiment, the third damping member 830 may cover up to the inner side surface of the layer formed at the higher position than the highest end of the camera module 440. According to an embodiment, the third damping member 830 may be attached to the display 420 and integrally formed with the display 420.

Although not depicted in FIG. 8A, FIGS. 8B and 8C, the electronic device may further include a transparent member attached to the window in an embodiment. For example, the electronic device may include the transparent member 450 of FIG. 4A or FIG. 4B at the back surface of the window.

Figure 9:
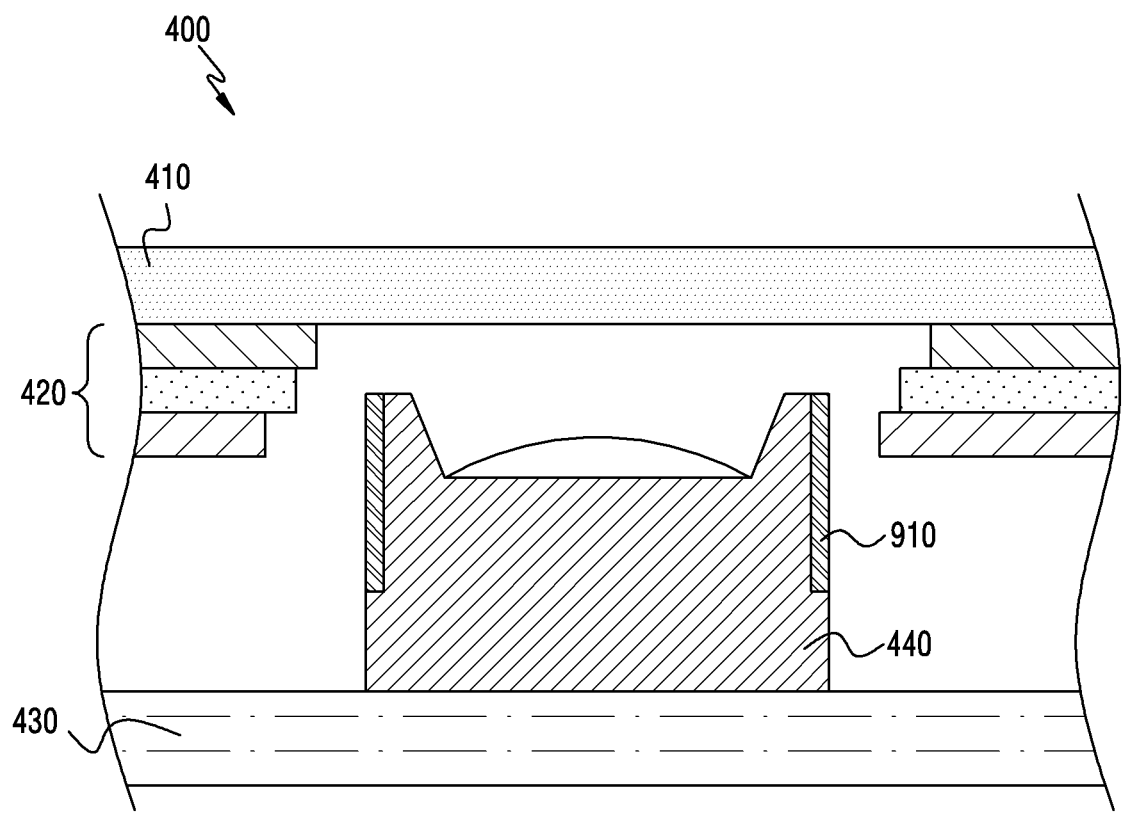
FIG. 9 is a cross-sectional view of an area including a camera module of an electronic device for detecting folding or unfolding of the electronic device by disposing a conductive member between the camera module and a display.

FIG. 9 is a cross-sectional view of an area including a camera module 440 of an electronic device (e.g., the electronic device 101 of FIG. 1) for detecting folding or unfolding of the electronic device (e.g., the electronic device 101 of FIG. 1) by disposing a conductive member 910 between the camera module 440 and a display 420.

Referring to FIG. 9, the second damping member 820 may include the conductive member 910 on a circumferential inner side surface. The conductive member 910, which is applied with an electric current, may operate as a capacitor. According to an embodiment, if the display 420 is slipped, capacitance of the conductive member 910 may change. The electronic device 400 according to an embodiment may detect the folding or the unfolding of the electronic device, 400, based on the capacitance change of the conductive member 910 disposed between the camera module 440 and the display 420.

Figure 10:
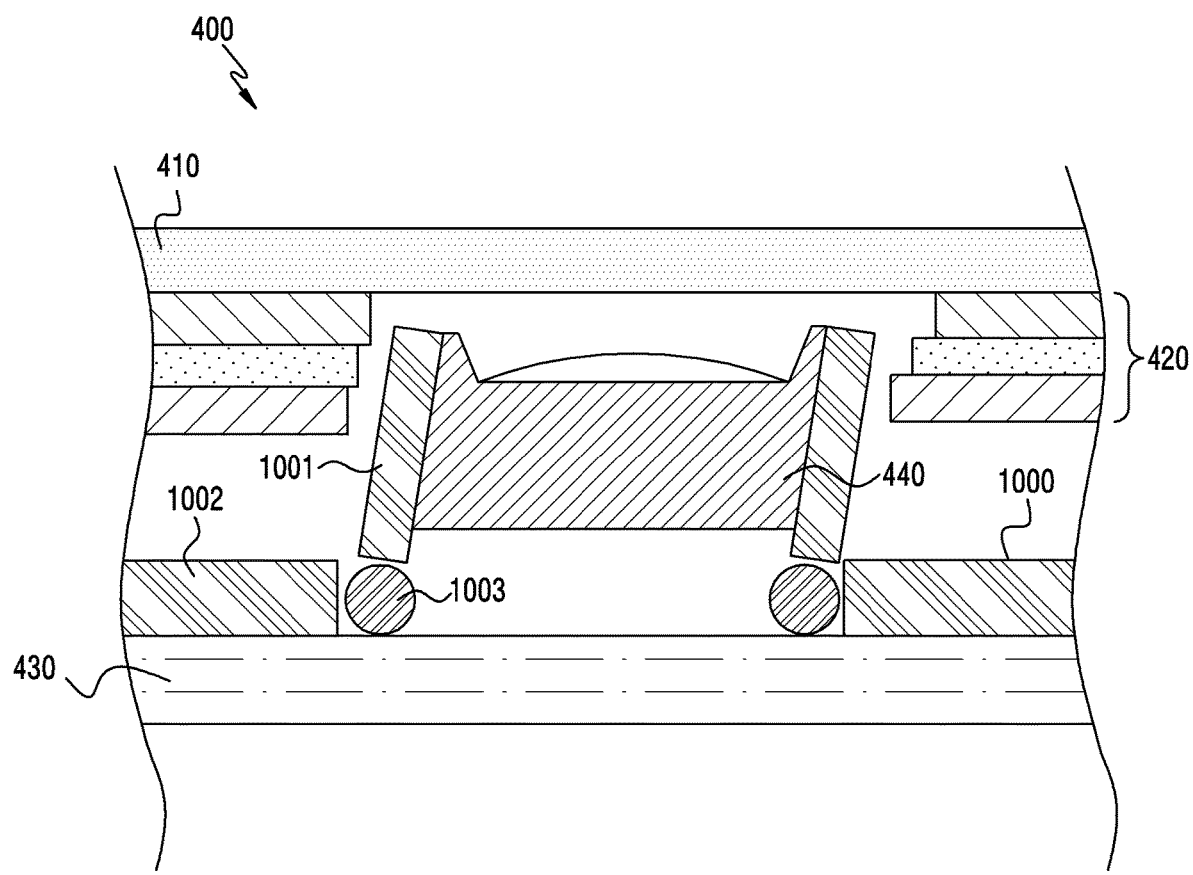
FIG. 10 is a cross-sectional view of an area including a camera module of an electronic device where a position of a camera module changes in response to folding or unfolding of the electronic device.

FIG. 10 is a cross-sectional view of an area including a camera module 440 of an electronic device (e.g., the electronic device 101 of FIG. 1) where a position of the camera module 440 changes in response to folding or unfolding of the electronic device (e.g., the electronic device 101 of FIG. 1).

Referring to FIG. 10, the state of the electronic device 400 may change (e.g., change from the upfolding to the folding) and the shape of the opening 422 of the display 420 may deform. The inner side surface 421 of the display 420 may get closer to or away from the camera module 440. If the inner side surface 421 of the display 420 approaches the camera module 440, the inner side surface 421 of the display 420 may collide with the camera module 440. According to an embodiment, to protect the camera module 440 from the impact by the display 420, the camera module 440 may move in response to the deformation of the inner side surface 421 of the display 420. The electronic device 400 may measure a folding angle of the electronic device 400, and move the camera module 440 based on the folding angle of the electronic device 400.

The electronic device 400 according to an embodiment may include a position adjusting structure 1000 for changing the position of the camera module 440 in response to the folding angle of the electronic device 400. The position adjusting structure 1000 may include a moving-part 1001 connected to the camera module 440, a fixed-part 1002 attached to a structure (e.g., the printed circuit board 430) inside the electronic device 400, and a connecting-part 1003 for interconnecting the moving-part 1001 and the fixed-part 1002.

According to an embodiment, the moving-part 1001 may be connected to the outer side surface of the camera module 440 to change the position of the camera module 440. For example, the moving-part 1001 may be operatively connected with the electronic device 400 to move according to the folded state of the electronic device 400, and may prevent the camera module 440 from being impacted by the inner side surface 421 of the display 420 by changing the position of the camera module 440. For example, the moving-part 1001 may be directly pushed by the inner side surface 421 of the display 420, and thus change the position of the camera module 440. In this case, the moving-part 1001, which includes a material for mitigating the impact, may reduce the impulse to the camera module 440.

According to another embodiment, if the moving-part 1001 includes a conductive material, it may detect a distance change between the inner side surface 421 of the display 420 and the moving-part 1001, by detecting the capacitance change of the structure including the conductive material. Based on the detected distance change, the electronic device 400 may change the position of the moving-part 1001 and prevent the camera module 440 from receiving the impact by the inner side surface 421 of the display 420.

According to an embodiment, the connecting-part 1003 may allow the moving-part 1001 to move with respect to the fixed-part 1002. For example, the connecting-part 1003 may have a hinge structure, so that the moving-part 1001 may rotate with respect to the fixed-part 1002.

Figure 11:
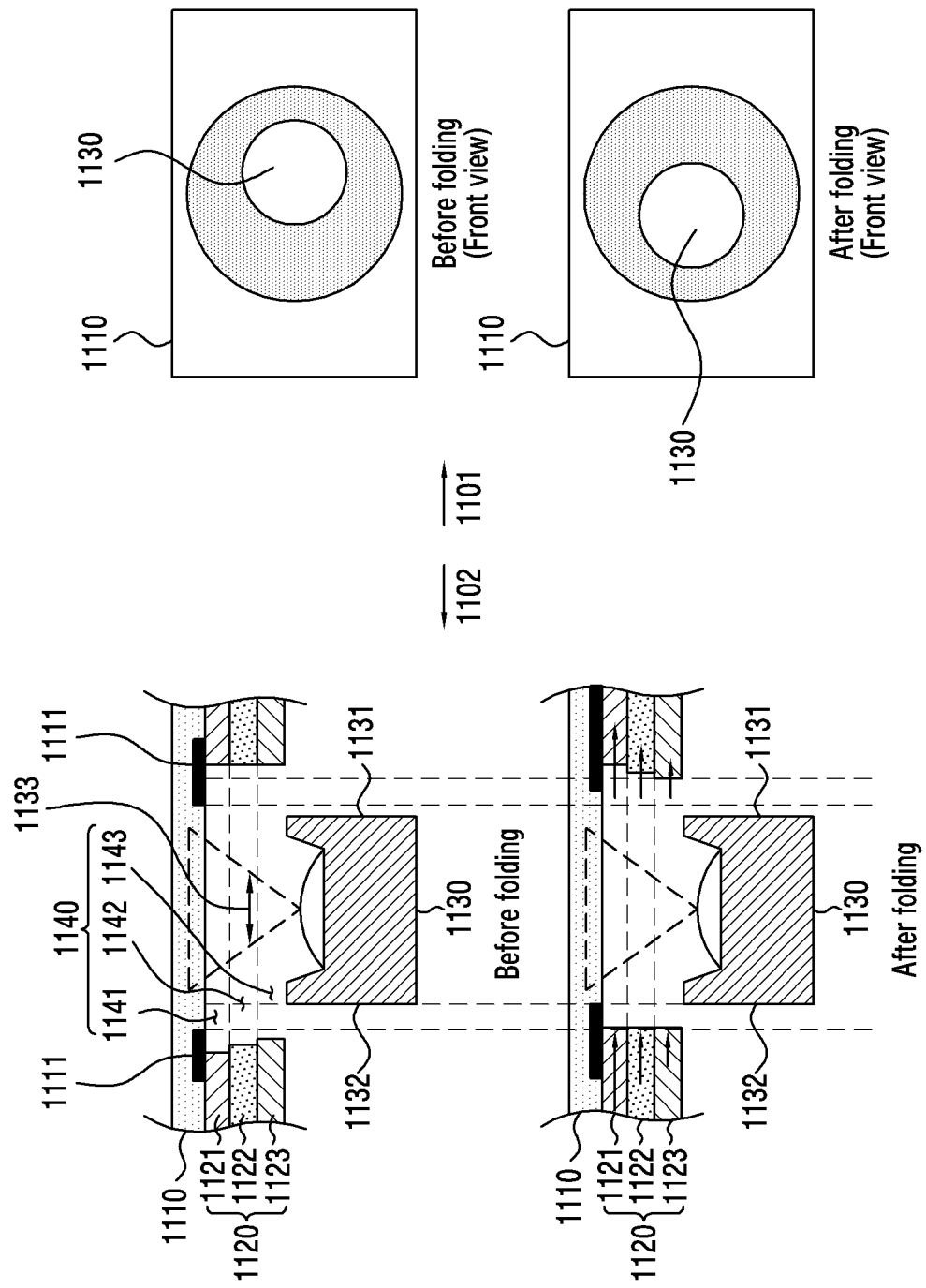
FIG. 11 illustrates slips in folded and unfolded states of an in-folding display in an embodiment.

FIG. 11 illustrates slips in folded and unfolded states of an in-folding display 120 in an embodiment. The left diagrams are cross-sectional views of the display 120, and the right diagrams are top views of the display 120. The upper diagrams depict the display 120 of the unfolded state, and the lower diagrams depict the display 120 of the folded state. If an electronic device (e.g., the electronic device 10 of FIG. 2A) is flat in an embodiment, a first portion and a second portion of the display 120 face the same direction. The display 120 may be folded such that the first portion and the second portion face each other according to the folding of the electronic device, and thus the display 120 may not be visible to the outside. FIG. 11 depicts the portion in which the folding axis of the display 120 is placed in a first direction in an embodiment.

The display 120 includes three layers 1121, 1122, and 1123 in an embodiment for the sake of explanations. The three layers 1121, 1122, and 1123 may include through holes 1141, 1142, and 1143 respectively corresponding to an angle of view 1133 of a camera 1130. In the embodiment, the first layer 1121 through the third layer 1123 include the through holes corresponding to the angle of view 1133 of the camera 1130, and inner circumferential surfaces of the through holes define a through portion 1140 of the display 120. Hereafter, the inner circumferential surface of the through portion 1140 may be understood as one or a combination of the inner circumferential surfaces of the through holes 1141, 1142, and 1143 of the layers 1121, 1122, and 1123.

A window 1110 is attached onto the display 120 and part of a rear surface of the window 1110 may include an opaque area 1111. For example, a black mask may be printed in part of the rear surface of the window 1110. The black mask may be printed along edges of the through portion 1140 formed in the display 120. The through portion 1140 and the opaque area 1111 may be configured such that the camera 1130 has no difficulty in collecting the light even if the display 120 is unfolded or folded. For example, the black mask may be printed on the rear surface of the window 1110 not to invade the angle of view 1133 of the camera 1130 in the unfolded or folded state of the electronic device.

An area surrounded by an inner boundary of the opaque area 1111 is transparent, and at least part of the camera 1130 under the window 1110 may be viewed therethrough. While an outside portion of an outer boundary of the opaque area 1111 is also transparent in the window 1110, the opaque display 120 is disposed below it, and accordingly an electronic part or structure disposed below the display 120 is not viewed outside the window 1110. Hereafter, the portion surrounded by the inner boundary of the opaque area 1111 is referred to as a transparent area.

In an embodiment, the inner circumferential surface of the through portion 1140 may include steps. For example, the step may be formed between the inner circumferential surface of the first through hole 1141 and the inner circumferential surface of the second through hole 1142, and between the inner circumferential surface of the second through hole 1142 and the inner circumferential surface of the third through hole 1143.

In an embodiment, the inner circumferential surface of the through portion 1140 may include steps. If the electronic device is unfolded, the steps may be formed between the first layer 1121, the second layer 1122, and the third layer 1123. A distance of the inner circumferential surface from a side surface 1132 of a second direction 1102 of the camera 1130 to the second direction 1120 may be the greatest in the first through hole 1141 and the smallest in the third through hole 1143. A distance of the inner circumferential surface from a side surface 1131 of a first direction 1102 of the camera 1130 to the first direction 1101 may be substantially identical in the first through hole 1141, the second through hole 1142, and the third through hole 1143.

In an embodiment, as the electronic device is folded, the layers 1121, 1122, and 1123 may be slipped and the shape of the through portion 1140 may change. According to the embodiment, the distance of the inner circumferential surface from the side surface 1131 of the first direction 1102 of the camera 1130 to the first direction 1101 in the folded state may be the greatest in the first through hole 1141 and the smallest in the third through hole 1143. The distance of the inner circumferential surface from the side surface 1132 of the second direction 1102 of the camera 1130 to the second direction 1120 may be substantially identical in the first through hole 1141, the second through hole 1142, and the third through hole 1143.

In an embodiment, the distance of the first direction 1101 side surface of the camera 1130 from the inner circumferential surface (e.g., the inner circumferential surface of the first through hole 1141, the inner circumferential surface of the second through hole 1142, or the inner circumferential surface of the third through hole 1143) of the through portion 1140 in the first direction 1102 may increase as the electronic device is folded, and the distance of the second direction 1102 side surface of the camera 1130 from the inner circumferential surface of the through portion 1140 in the second direction 1102 may decrease as the electronic device is folded.

In an embodiment, as the display 120 is folded or unfolded, the slip degree of each layer with respect to the camera 1130 may differ. In the embodiment, the first layer 1121, the second layer 1122, and the third layer 1123 may be slipped in the first direction 1101 with respect to the camera 1130 according to the folding of the display 120, and slip distances of the layers 1121, 1122, and 1123 may differ from one another. According to the embodiment, the farther layer from the window 1110, the smaller slip distance. For example, the first layer 1121 may be slipped by a first distance in the first direction 1101, and the second layer 1122 may be slipped by a second distance which is smaller than the first distance in the first direction 1101.

In an embodiment, the inner circumferential surface of the through portion 1140 of the display 120 may be not viewed outside the window 1110 due to the opaque area 1111. The plurality of the layers 1121, 1122, and 1123 forming the display 120 is slipped according the the folding or the unfolding of the electronic device, but the opaque area 1111 is printed in consideration of the slip degree of the display 120 and the boundary surrounding the through hole of the display 120 may not be visible outside the 1110 even if the display 120 is slipped in an embodiment. For example, assuming a virtual cylindrical surface vertically extending toward the camera 1130 in the inner boundary of the opaque area 1111, the inner circumference of the through portion 1140 may be positioned outside the cylindrical surface. The through portion 1140 may be configured such that its cylindrical surface does not invade into the cylindrical surface even if the display 140 is folded or unfolded.

The right diagrams depict the camera 1130 exposed on the front surface of the display 120. The camera 1130 may be viewed to the outside through a portion surrounded with the inner boundary of the opaque area 1111 in the window 1110. Since the window 1110 is slipped with respect to the camera 1130 according to the folding of the electronic device, the position on the transparent area of the camera 1130 may be viewed differently according to each state. For example, the camera 1130 may be biased to the first direction 1101 from the center of the transparent area if the electronic device is folded, and the camera 1130 may be biased to the second direction 1102 from the center of the transparent area if the electronic device is unfolded.

Figure 12:
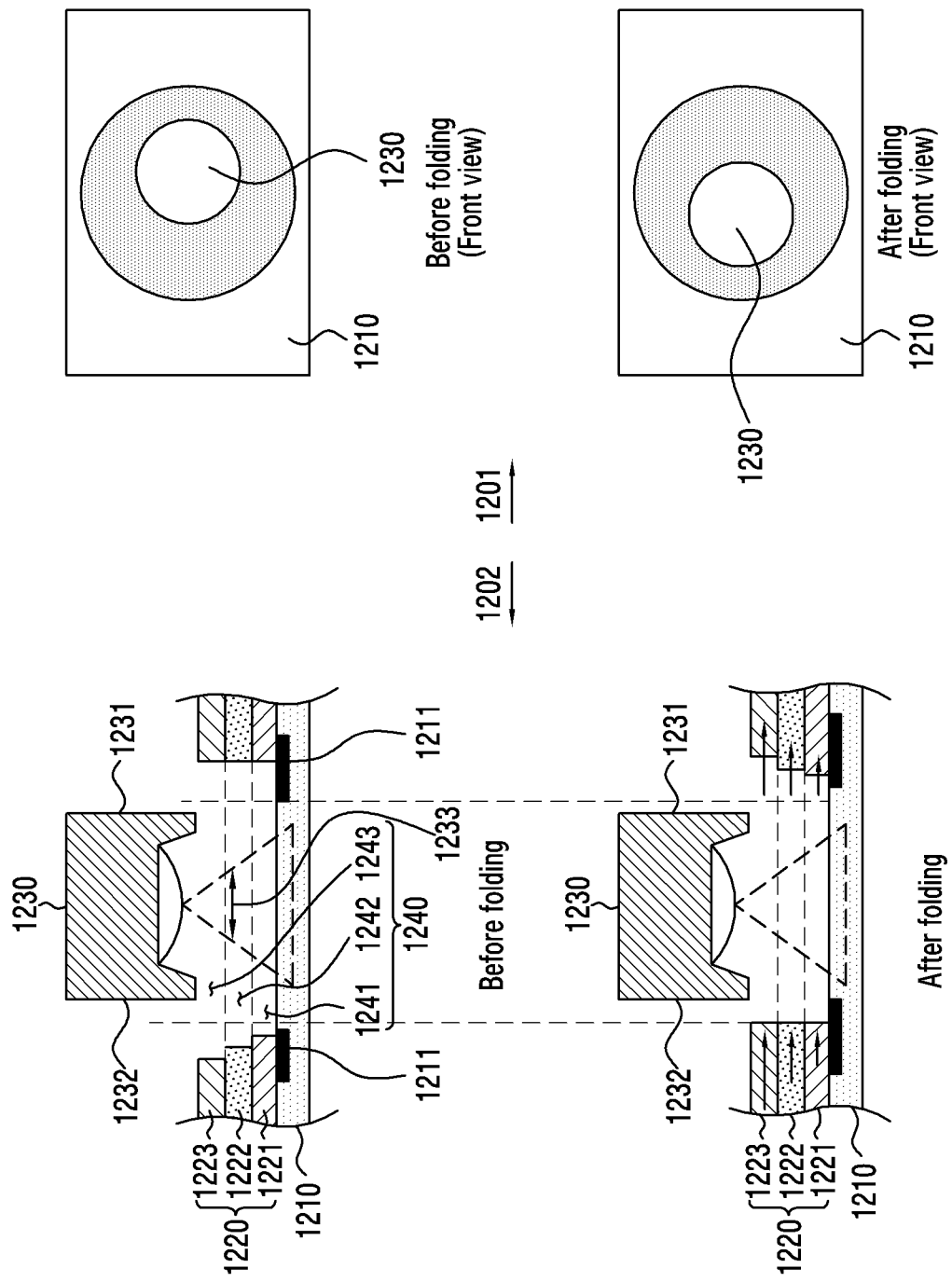
FIG. 12 illustrates slips in folded and unfolded states of an out-folding display in an embodiment.

FIG. 12 illustrates slips in folded and unfolded states of an out-folding display 1220 in an embodiment. The left diagrams are cross-sectional views of the display 1220, and the right diagrams are top views of the display 1220. The upper diagrams depict the display 1220 of the unfolded state, and the lower diagrams depict the display 1220 of the folded state. Unlike FIG. 11, the electronic device may be folded such a first portion and a second portion face different directions in FIG. 12. Even if the electronic device is folded, the display 1220 may maintain the exposed state outside the electronic device. FIG. 12 depicts the portion in which the folding axis of the display 1220 is placed in a first direction 1201.

The display 1220 includes three layers 1221, 1222, and 1223 in an embodiment for the sake of explanations. The three layers 1221, 1222, and 1223 may include through holes 1241, 1242, and 1243 respectively corresponding to an angle of view 1233 of a camera 1230. The first layer 1221 through the third layer 1223 include through holes corresponding to the angle of view 1233 of the camera 1230, and inner circumferential surfaces of the through holes define a through portion 1240 of the display 1220. Hereafter, the inner circumferential surface of the through portion 1240 may be understood as one or a combination of the inner circumferential surfaces of the through holes of the layers.

A window 1210 is attached onto the display 1220 and part of a rear surface of the window 1210 may include an opaque area 1211. For example, a black mask may be printed in part of the rear surface of the window 1210. The black mask may be printed along edges of the through holes formed in the display 1220. The through holes and the opaque area 1211 may be configured such that the camera 1230 has no difficulty in collecting the light even if the display 1220 is unfolded or folded. For example, the black mask may be printed on the rear surface of the window 1210 not to invade the angle of view 1233 of the camera 1230 in the unfolded or folded state of the electronic device.

An area surrounded by an inner boundary of the opaque area 1211 is transparent, and at least part of the camera 1230 under the window 1210 may be viewed therethrough. While an outside portion of an outer boundary of the opaque area 1211 is also transparent in the window 1210, the opaque display 1220 is disposed below it, and accordingly an electronic part or structure disposed below the display 1220 is not viewed outside the window 1210. Hereafter, the portion surrounded by the inner boundary of the opaque area 1211 is referred to as a transparent area.

In an embodiment, the inner circumferential surface of the through portion 1240 may include steps. For example, the step may be formed between the inner circumferential surface of the first through hole 1241 and the inner circumferential surface of the second through hole 1242, and between the inner circumferential surface of the second through hole 1242 and the inner circumferential surface of the third through hole 1243.

In an embodiment, a first portion 1231 facing the camera 1230 in the first direction 1201 in the inner circumferential surface of the through portion 1240 may include steps in the flat state of the electronic device. If the electronic device is flat, the steps may exist between the first layer 1221, the second layer 1222, and the third layer 1223. A distance of the inner circumferential surface from a side surface 1232 of a second direction 1202 of the camera 1230 to the second direction 1220 may be the greatest in the third through hole 1243 and the smallest in the first through hole 1241. A distance of the inner circumferential surface from a side surface 1231 of a first direction 1202 of the camera 1230 in the first direction 1201 may be substantially identical in the first through hole 1241, the second through hole 1242, and the third through hole 1243.

In an embodiment, as the electronic device is folded, the slip is formed between the layers and the shape of the through portion 1240 may change. According to the embodiment, the distance of the inner circumferential surface from the side surface 1231 of the first direction 1201 of the camera 1230 in the first direction 1201 may be the greatest in the third through hole 1243 and the smallest in the first through hole 1241. The distance of the inner circumferential surface from the side surface 1232 of the second direction 1202 of the camera 1230 in the second direction 1220 may be substantially identical in the first through hole 1241, the second through hole 1242, and the third through hole 1243.

In an embodiment, the distance of the side surface of the first direction 1201 of the camera 1230 from the inner circumferential surface (e.g., the inner circumferential surface of the first through hole 1241, the inner circumferential surface of the second through hole 1242, or the inner circumferential surface of the third through hole 1243) of the through portion 1240 in the first direction 1201 may increase as the electronic device is folded, and the distance of the second direction 1202 side surface of the camera 1230 from the inner circumferential surface in the second direction 1202 may decrease as the electronic device is folded.

In an embodiment, as the display 120 is folded or unfolded, the slip degree of each layer with respect to the camera 1230 may differ. In the embodiment, the first layer 1221, the second layer 1222, and the third layer 1223 may be slipped in the first direction 1201 with respect to the camera 1230 according to the folding of the display 120, and slip distances of the layers may differ from one another. According to the embodiment, the farther layer from the window 1210, the greater slip distance. For example, the first layer 1221 may be slipped by a first distance in the first direction 1201, and the second layer 1222 may be slipped by a second distance which is greater than the first distance in the first direction 1201.

In an embodiment, the inner circumferential surface of the through portion 1240 of the display 1220 may be not viewed outside the window 1210 due to the opaque area 1211. The slips are formed between the plurality of the layers forming the display 1220 according the folding or the unfolding of the electronic device, but the opaque area 1211 is printed in consideration of the slip degree of the display 1220 and the boundary surrounding the through hole of the display 1220 may not be visible outside the 1210 even if the display 1220 is slipped in an embodiment. For example, assuming a virtual cylindrical surface vertically extending toward the camera 1230 in the inner boundary of the opaque area 1211, the inner circumference of the through portion 1240 may be positioned outside the cylindrical surface. The through portion 1240 may be configured such that its cylindrical surface does not invade into the cylindrical surface even if the display 1220 is folded or unfolded.

The right diagrams depict the camera 1230 exposed on the front surface of the display 1220. The camera 1230 may be viewed to the outside through a portion surrounded with the inner boundary of the opaque area 1211 in the window 1210. Since the window 1210 is slipped with respect to the camera 1230 according to the folding of the electronic device, the position on the transparent area of the camera 1230 may be viewed differently according to each state. For example, the camera 1230 may be biased to the first direction 1201 from the center of the transparent area if the electronic device is folded, and the camera 1230 may be biased to the second direction 1202 from the center of the transparent area if the electronic device is unfolded.

Meanwhile, the display may be formed by sequentially stacking a window, a polarizing layer, a display panel, and a metal plate in an embodiment. The display may be divided into an upper portion including the window, and a lower portion including the metal plate based on the display panel.

In an embodiment, the slip between the plurality of the layers according to the folding or the unfolding of the display may differ in the upper portion and the lower portion of the display. For example, the slip between the window, the display panel and the window may be greater than the slip between the display panel and the metal plate.

The slip between the plurality of the layers may differ according to the position away from the folding axis. For example, the slip between the display panel and the window may increase as approaching the folding axis. This is because the PSA is attached between the display panel and the window, and PSA resistance increases as getting away from the folding axis. By contrast, the slip between the display panel and the metal plate may decrease as approaching the folding axis.

In an embodiment, an electronic device may include a housing including a first part, a second part, and a rotation structure interconnecting the first part and the second part to dispose the first part and the second part to form an angle of an allowable range; a window forming one surface of the housing; a flexible display attached beneath the window and including an opening; a camera module disposed below the window, aligned to the opening of the flexible display, and positioned in the opening with at least part; and a first transparent member disposed on a portion corresponding to the opening of the window, wherein the camera module may be spaced from the window or the first transparent member.

In an embodiment, the first transparent member may be disposed on a rear surface of the window.

In an embodiment, a distance between the camera module and the first transparent member may range from 0.1 mm to 0.2 mm.

In an embodiment, the first transparent member may have a film form.

In an embodiment, the first transparent member may be disposed on a front surface of the window.

In an embodiment, the electronic device may be disposed on a front surface of the window, and further include an additional transparent member including an opening which accommodates the first transparent member.

In an embodiment, a distance between the camera module and the window may range from 0.1 mm to 0.2 mm.

In an embodiment, the camera module may include a second transparent member, and the second transparent member may be disposed between the camera module and the window.

In an embodiment, the second transparent member may include an anti reflection coating layer.

In an embodiment, the electronic device may further include a damping member disposed between the camera module and the window.

In an embodiment, the electronic device may further include a reinforcing structure for protecting the camera module from an external impact, and the reinforcing structure may be disposed between the camera module and the printed circuit board.

In an embodiment, the flexible display may include a plurality of layers including a first layer disposed below the window and a second layer disposed below the first layer, the first layer may include a first inner side surface which forms a first opening corresponding to the camera module, the second layer may include a second inner side surface which forms a second opening corresponding to the camera module, at least part of the camera module may be disposed in a space formed by the first inner side surface, the second inner side surface and the window, and the first inner side surface and the second inner side surface may be formed such that, while the first part and the second part form an allowable angle, a distance from a central axis of the camera module to a first side of the first inner side surface is shorter than a distance from the central axis of the camera module to a second side correspond ding to the first side of the second inner side surface, and a distance from the central axis of the camera module to a side opposite to the first side of the first inner side surface is longer than a distance from the central axis of the camera module to a side opposite to the second side of the second inner side surface.

In an embodiment, the electronic device may further include a damping member disposed in an outer side surface of the camera module, and mitigating an impact applied by the flexible display to the camera module.

In an embodiment, the electronic device may further include a damping member disposed in the first inner side surface and the second inner side surface, and mitigating an impact applied by the flexible display to the camera module.

In an embodiment, the flexible display may include a plurality of layers including a first layer disposed below the window and a second layer disposed below the first layer, the first layer may include a first inner side surface which forms a first opening corresponding to the camera module, the second layer may include a second inner side surface which forms a second opening corresponding to the camera module, at least part of the camera module may be disposed in a space formed by the first inner side surface, the second inner side surface and the window, and the first inner side surface and the second inner side surface may be formed such that, while the first part and the second part form an allowable angle, a difference of a distance from a central axis of the camera module to a first side of the first inner side surface and a distance from the central axis of the camera module to a second side corresponding to the first side of the second inner side surface is greater than a difference of a distance from the central axis of the camera module to a side opposite to the first side of the first inner side surface and a distance from the central axis of the camera module to a side opposite to the second side of the second inner side surface.

In an embodiment, an electronic device may include a housing including a first part, a second part, and a rotation structure interconnecting the first part and the second part to dispose the first part and the second part to form an angle of an allowable range; a window forming one surface of the housing; a flexible display attached beneath the window and including an opening; and a camera module disposed below the window, aligned to the opening of the flexible display, and positioned in the opening with at least part, the flexible display may include a plurality of layers including a first layer disposed below the window and a second layer disposed below the first layer, the first layer may include a first inner side surface which forms a first opening corresponding to the camera module, the second layer may include a second inner side surface which forms a second opening corresponding to the camera module, at least part of the camera module may be disposed in a space formed by the first inner side surface, the second inner side surface and the window, and the first inner side surface and the second inner side surface may be formed such that, while the first part and the second part form an allowable angle, a distance from a central axis of the camera module to a first side of the first inner side surface is shorter than a distance from the central axis of the camera module to a second side corresponding to the first side of the second inner side surface, and a distance from the central axis of the camera module to a side opposite to the first side of the first inner side surface is longer than a distance from the central axis of the camera module to a side opposite to the second side of the second inner side surface.

In an embodiment, the electronic device may further include a damping member disposed in an outer side surface of the camera module, and mitigating an impact applied by the flexible display to the camera module.

In an embodiment, the electronic device may further include a damping member disposed in the first inner side surface and the second inner side surface, and mitigating an impact applied by the flexible display to the camera module.

In an embodiment, the electronic device may further include a conductive member disposed in the outer side surface of the camera module, and the at least one processor may detect capacitance change of the conductive member according to a folded state change of the electronic device, and identify the folded state of the electronic device based on the detected capacitance change.

In an embodiment, an electronic device may include a housing including a first part, a second part, and a rotation structure interconnecting the first part and the second part to dispose the first part and the second part to form an angle of an allowable range; a window forming one surface of the housing; a flexible display attached beneath the window and including an opening; and a camera module disposed below the window, aligned to the opening of the flexible display, and positioned in the opening with at least part, the flexible display may include a plurality of layers including a first layer disposed below the window and a second layer disposed below the first layer, the first layer may include a first inner side surface which forms a first opening corresponding to the camera module, the second layer may include a second inner side surface which forms a second opening corresponding to the camera module, at least part of the camera module may be disposed in a space formed by the first inner side surface, the second inner side surface and the window, and the first inner side surface and the second inner side surface may be formed such that, while the first part and the second part form an allowable angle, a difference of a distance from a central axis of the camera module to a first side of the first inner side surface and a distance from the central axis of the camera module to a second side corresponding to the first side of the second inner side surface is greater than a difference of a distance from the central axis of the camera module to a side opposite to the first side of the first inner side surface and a distance from the central axis of the camera module to a side opposite to the second side of the second inner side surface.

In an embodiment, a portable communication device may include a housing which forms an exterior of the portable communication device; a flexible display at least partially received in the housing and bendable with respect to a bending axis, the flexible display including at least one layer, an opening formed in the at least one layer; and an image sensor module at least partially positioned in a space formed by the opening, the at least one layer may include a first inner side surface positioned in a first direction based on the image sensor module and a second inner side surface positioned in a second direction opposite to the first direction based on the image sensor module, as the flexible display is at least partially bent, the first inner side surface may be moved in the second direction, and if the flexible display is substantially flat, a first separation distance between a first side surface of the image sensor module facing the first inner side surface of the at least one layer and the first inner side surface of the at least one layer may be greater than a second separation distance between a second side surface of the image sensor module facing the second inner side surface of the at least one layer and the second inner side surface of the at least one layer.

In an embodiment, the at least one layer may include a first layer and a second layer disposed between the housing and the first housing, the first layer may include a first inner side surface portion disposed in the first direction based on the image sensor module, the second layer may include a second inner side surface portion disposed in the first direction based on the image sensor module, and if the flexible display is substantially flat, a third separation distance between the first side surface of the image sensor module and the first inner side surface portion may be different from a fourth separation distance between the first side surface of the image sensor module and the second inner side surface portion.

In an embodiment, if the flexible display is substantially flat, the third separation distance may be greater than the fourth separation distance.

In an embodiment, if the housing is bent to form an allowable minimum angle, the third separation distance may be equal to the fourth separation distance or greater than the fourth separation distance.

In an embodiment, the at least one layer may further include a third layer positioned between the first layer and the second layer, the third layer may include a third inner side surface portion positioned in the first direction based on the image sensor module, and if the flexible display is substantially flat, a fifth separation distance between the image sensor module and the third inner side surface portion may be smaller than the third separation distance, and greater than the fourth separation distance.

In an embodiment, in claim 1, the at least one layer may be not physically connected to the image sensor module.

In an embodiment, if the housing is bent to form an allowable minimum angle, the first inner side surface may not contact the image sensor module.

In an embodiment, the electronic device may further include a transparent flexible plate disposed on the flexible display to cover the opening.

In an embodiment, if the flexible display is substantially flat, the at least one layer may be disposed, to substantially symmetrically view a first BM area between the first inner side surface of the at least one layer and a center of the image sensor module and a second BM area between the second inner side surface of the at least one layer and the center of the image sensor module.

In an embodiment, a portable communication device may include a housing which forms an exterior of the portable communication device; a flexible display at least partially received in the housing and bendable with respect to a bending axis, the flexible display including a first layer and a second layer positioned between the housing and the first layer, an opening formed in the first layer and the second layer; and an image sensor module at least partially positioned in a space formed by the opening, the first layer may include a first inner side surface positioned in a first direction based on the image sensor module and a second inner side surface positioned in a second direction opposite to the first direction based on the image sensor module, the second layer may include a third inner side surface positioned in the first direction based on the image sensor module and a fourth inner side surface positioned in the second direction based on the image sensor module, as the flexible display is at least partially bent, the first inner side surface and the third inner side surface may be moved in the second direction, and if the flexible display is substantially flat, a first separation distance between a side surface of the image sensor module facing the first inner side surface of the first layer and the first inner side surface of the first layer may be different from a second separation distance between the side surface of the image sensor module and the third inner side surface of the second layer.

In an embodiment, if the flexible display is substantially flat, the first separation distance may be greater than the second separation distance.

In an embodiment, if the housing is bent to form an allowable minimum angle, the first separation distance may be equal to the second separation distance or greater than the second separation distance.

In an embodiment, a portable communication device may include a housing; an image sensor module received in the housing; and a flexible display received in the housing, and bendable with at least a partial area, the flexible display including a plurality of layers, an opening formed at a position corresponding to the image sensor module in at least one layer of the plurality of the layers, the at least one layer configured to, as the flexible display is bent or unbent, change a first distance between a first portion of a first direction with respect to the opening of the at least one layer and a first side surface of the image sensor module facing the first portion, and a second distance between a second portion of a second direction with respect to the opening of the at least one layer and a second side surface of the image sensor module facing the second portion.

The embodiment related to a specific drawing is described to include only the components depicted in the corresponding drawing in this disclosure. The embodiment of the present disclosure is not limited thereto, and does not exclude an embodiment which combines components included in several drawings. One embodiment may be configured by combining components included in different embodiments. For example, the electronic device shown in FIG. 4A or FIG. 4B may further include the transparent member 470 of FIG. 7. As another example, the electronic device shown in FIG. 4A or FIG. 4B may further include the first damping member 810 of FIG. 8A.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to specific embodiments thereof, but various modifications may be made without departing from the scope of this disclosure. Therefore, the scope of this disclosure should not be limited to the described embodiments but should be defined by the scope of the claims as below and their equivalents.

What is claimed is:

1. A portable communication device, comprising:
a housing which forms an exterior of the portable communication device;
a flexible display at least partially received in the housing and bendable with respect to a bending axis, the flexible display comprising at least one layer, an opening formed in the at least one layer; and
an image sensor module at least partially positioned in a space formed by the opening,
wherein the at least one layer, comprises a first inner side surface positioned in a first direction based on the image sensor module and a second inner side surface positioned in a second direction opposite to the first direction based on the image sensor module,
as the flexible display is at least partially bent, the first inner side surface is moved in the second direction, and
if the flexible display is substantially flat, a first separation distance between a first side surface of the image sensor module facing the first inner side surface of the at least one layer and the first inner side surface of the at least one layer is greater than a second separation distance between a second side surface of the image sensor module facing the second inner side surface of the at least one layer and the second inner side surface of the at least one layer.

2. The portable communication device of claim 1, wherein the at least one layer comprises a first layer and a second layer disposed between the housing and the first housing,
the first layer comprises a first inner side surface portion disposed in the first direction based on the image sensor module,
the second layer comprises a second inner side surface portion disposed in the first direction based on the image sensor module, and
if the flexible display is substantially flat, a third separation distance between the first side surface of the image sensor module and the first inner side surface portion is different from a fourth separation distance between the first side surface of the image sensor module and the second inner side surface portion.

3. The portable communication device of claim 2, wherein, if the flexible display is substantially flat, the third separation distance is greater than the fourth separation distance.

4. The portable communication device of claim 3, wherein, if the housing is bent to form an allowable minimum angle, the third separation distance is equal to the fourth separation distance or greater than the fourth separation distance.

5. The portable communication device of claim 2, wherein the at least one layer further comprises a third layer positioned between the first layer and the second layer,
the third layer comprises a third inner side surface portion positioned in the first direction based on the image sensor module, and
if the flexible display is substantially flat, a fifth separation distance between the image sensor module and the third inner side surface portion is smaller than the third separation distance, and greater than the fourth separation distance.

6. The portable communication device of claim 1, wherein the at least one layer is not physically connected to the image sensor module.

7. The portable communication device of claim 1, wherein, if the housing is bent to form an allowable minimum angle, the first inner side surface does not contact the image sensor module.

8. The portable communication device of claim 1, further comprising:
a transparent flexible plate disposed on the flexible display to cover the opening.

9. The portable communication device of claim 1, wherein, if the flexible display is substantially flat, the at least one layer is disposed, to substantially symmetrically view a first black mask (BM) area between the first inner side surface of the at least one layer and a center of the image sensor module and a second BM area between the second inner side surface of the at least one layer and the center of the image sensor module.

10. A portable communication device, comprising:
a housing which forms an exterior of the portable communication device;
a flexible display at least partially received in the housing and bendable with respect to a bending axis, the flexible display comprising a first layer and a second layer positioned between the housing and the first layer, an opening formed in the first layer and the second layer; and an image sensor module at least partially positioned in a space formed by the opening, wherein the first layer, comprises a first inner side surface positioned in a first direction based on the image sensor module and a second inner side surface positioned in a second direction opposite to the first direction based on the image sensor module, the second layer, comprises a third inner side surface positioned in the first direction based on the image sensor module and a fourth inner side surface positioned in the second direction based on the image sensor module, as the flexible display is at least partially bent, the first inner side surface and the third inner side surface are moved in the second direction, and if the flexible display is substantially flat, a first separation distance between a side surface of the image sensor module facing the first inner side surface of the first layer and the first inner side surface of the first layer is different from a second separation distance between the side surface of the image sensor module and the third inner side surface of the second layer.

11. The portable communication device of claim 10, wherein, if the flexible display is substantially flat, the first separation distance is greater than the second separation distance.

12. The portable communication device of claim 11, wherein, if the housing is bent to form an allowable minimum angle, the first separation distance is equal to the second separation distance or greater than the second separation distance.

13. A portable communication device, comprising:
a housing;
an image sensor module received in the housing; and
a flexible display received in the housing, and bendable with at least a partial area, the flexible display comprising a plurality of layers, an opening formed at a position corresponding to the image sensor module in at least one layer of the plurality of the layers, the at least one layer configured to, as the flexible display is bent or unbent, change a first distance between a first portion of a first direction with respect to the opening of the at least one layer and a first side surface of the image sensor module facing the first portion, and a second distance between a second portion of a second direction with respect to the opening of the at least one layer and a second side surface of the image sensor module facing the second portion.

* * * * *